(12) United States Patent
Thompson et al.

(10) Patent No.: US 10,613,699 B2
(45) Date of Patent: *Apr. 7, 2020

(54) MULTI-VIEW DISPLAY CUEING, PROMPTING, AND PREVIEWING

(71) Applicant: Misapplied Sciences, Inc., Redmond, WA (US)

(72) Inventors: David Steven Thompson, Redmond, WA (US); Albert Han Ng, Redmond, WA (US); Paul Henry Dietz, Redmond, WA (US)

(73) Assignee: MISAPPLIED SCIENCES, INC., Redmond, WA (US)

(*) Notice: Subject to any disclaimer, the term of this patent is extended or adjusted under 35 U.S.C. 154(b) by 337 days.

This patent is subject to a terminal disclaimer.

(21) Appl. No.: 15/179,781

(22) Filed: Jun. 10, 2016

(65) Prior Publication Data

US 2016/0364087 A1 Dec. 15, 2016

Related U.S. Application Data

(60) Provisional application No. 62/174,479, filed on Jun. 11, 2015.

(51) Int. Cl.
| | |
|---|---|
| G06F 9/48 | (2006.01) |
| G06F 3/0481 | (2013.01) |
| G06F 3/01 | (2006.01) |
| G06F 3/00 | (2006.01) |
| H04N 13/351 | (2018.01) |
| H04N 13/30 | (2018.01) |

(52) U.S. Cl.
CPC ............ G06F 3/0481 (2013.01); G06F 3/005 (2013.01); G06F 3/011 (2013.01); G06F 3/013 (2013.01); H04N 13/351 (2018.05); *H04N 2013/403* (2018.05)

(58) Field of Classification Search
CPC ......... H04N 2013/0463; H04N 13/351; H04N 2013/403; G09G 5/10; G06F 3/0481; G06F 3/005; G06F 3/011; G06F 3/013
See application file for complete search history.

(56) References Cited

U.S. PATENT DOCUMENTS

| 7,462,104 B2* | 12/2008 | Di Cesare ............. A63F 13/005 273/430 |
| 2005/0093986 A1* | 5/2005 | Shinohara .......... G06Q 30/0603 348/208.1 |
| 2009/0109126 A1* | 4/2009 | Stevenson .............. B60K 37/00 345/4 |

(Continued)

*Primary Examiner* — Jennifer N To
*Assistant Examiner* — K C Chen
(74) *Attorney, Agent, or Firm* — K&L Gates LLP

(57) ABSTRACT

Systems and methods are described for displaying on a viewing surface of a multi-view display targeted instructional content to a first viewer in a viewing space such that other viewers in other locations of the viewing space are unable to observe the instructional content. The multi-view display is configured to provide differentiated content to viewers located in different positions around the display. In some embodiments, the viewing surface is located in a venue such as a theater, the first viewer is a speaker located on a stage in the venue, and the instructional content is text from a speech or performance to be presented by the speaker.

27 Claims, 15 Drawing Sheets

(56) References Cited

U.S. PATENT DOCUMENTS

2015/0092026 A1* 4/2015 Baik .................... H04N 13/122
                                                        348/54
2015/0279321 A1* 10/2015 Falconer ................. G09G 5/10
                                                        345/589
2016/0219268 A1* 7/2016 Strom ..................... G06F 3/012

* cited by examiner

MULTI-VIEW DISPLAY CUEING, PROMPTING, AND PREVIEWING

CROSS-REFERENCE TO RELATED APPLICATIONS

This application claims the benefit of U.S. Provisional Application No. 62/174,479, filed Jun. 11, 2015, the disclosure of which is incorporated herein by reference in its entirety.

FIELD

This application relates to electronic displays.

BACKGROUND

There are situations in which presenters desire the aid of scripts or cues that are visible to themselves, but not to their audience or camera capturing their presentation. Typically, the intent is to make the speech, performance, or other presentation appear spontaneous or well-rehearsed, and not something conspicuously being read or directed. In the past, teleprompters or cue cards have been used for this purpose. Unfortunately, these approaches have a number of shortcomings. Notably, it is difficult to position the teleprompter or cue card in a location that is simultaneously viewable by the presenter, but undetectable by the audience in a way that enables the presenter to maintain the appearance of presenting without external aids.

Some teleprompters, such as those used by politicians when making speeches, utilize a pane of glass positioned at the top of a stand at an angle such that the presenter standing directly in front of the pane of glass can see the words projected onto the front side of the glass. However, the projected words are not visible when viewed from behind the pane of glass. The audience positioned behind the teleprompter is able to see the teleprompter, including the pane of glass, but the words projected onto the glass are not visible. As a result, the audience is aware that the speaker is likely using the teleprompter because of its presence in front of the speaker, but the audience is unable to see what is being displayed to the speaker. Anyone positioned to see the front of the front side of the pane of glass would be able to see both the teleprompter as well as the displayed text, just as it is seen by the speaker.

SUMMARY

Systems and methods are described for displaying on a viewing surface of a multi-view display targeted instructional content to a first viewer in a viewing space such that other viewers in other locations of the viewing space are unable to observe the instructional content. The multi-view display is configured to provide differentiated content to viewers located in different positions around the display. In some embodiments, the viewing surface is located in a venue such as a theater, the first viewer is a speaker located on a stage in the venue, and the instructional content is text from a speech or performance to be presented by the speaker. The viewing surface of the multi-view display need not be hidden and can be positioned in plain view, such as on one of the walls of the venue. The audience seated in the venue in front of the speaker are positioned such that they can see the viewing surface of the multi-view display, but the instructional content is displayed such that the audience is unable to see the content. When the audience members not located in the speaker's viewing space look at the viewing surface, they may see a blank surface or different content than what is being viewed by the speaker. As a result, the speaker can be provided with prompts or cues that are undetectable by the audience in a way that enables the presenter to maintain the appearance of presenting without external aids.

In some embodiments, the system can simultaneously display different instructional content to multiple speakers on stage, such that each speaker sees on the viewing surface instructional content targeted to that speaker. For example, a team of newscasters, a sales team, a dance troupe, a group of teachers, multiple speakers, a band, an orchestra, or a stage populated by actors, could in each case share the same multi-view display, or an array of multi-view displays, with each individual seeing personalized script lines, cues, prompts, parts in a score, or other individualized information, imagery, or content.

The ability to control exactly who sees what on a multi-view display system used for cueing, prompting, and similar applications can provide great flexibility in where the display is located, how large it is, and how many can be used in a given event. The viewing surface of the display can be configured into many shapes, forms, and sizes, and combined with other technologies and mediums, allowing even better concealment, more flexibility, and more uses.

In accordance with embodiments of the present invention, a method of providing targeted instructions is provided. The method comprises: operating a multi-view display having a viewing surface visible to viewers positioned in a viewing space; and displaying on the viewing surface instructional content selectively targeted and visible to a first viewer positioned in a first viewing zone of the viewing space; wherein the instructional content visible to the first viewer is displayed such that the instructional content visible to the first viewer is not visible to a second viewer observing the viewing surface from a second viewing zone of the viewing space.

In accordance with embodiments of the present invention, a computing device is provided, comprising: a processor; and a non-transitory computer-readable memory storing computer-executable instructions which when executed cause the processor to perform a method comprising: operating a multi-view display having a viewing surface visible to viewers positioned in a viewing space; and displaying on the viewing surface instructional content visible to a first viewer positioned in a first viewing zone of the viewing space, the instructional content comprising one or more of: text to be spoken by the first viewer, instructions for action by the first viewer, or an image to be viewed by the first viewer; wherein the instructional content is displayed such that the instructional content is not visible to viewers observing the viewing surface from a second viewing zone of the viewing space.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for displaying targeted instructional content to a first viewer in a viewing space such that other viewers at other locations within the viewing space are unable to observe the instructional content. Those other viewers may see nothing displayed on the viewing surface or may see different content than what is simultaneously displayed to the first viewer. As a result, a number of individuals and groups can each see targeted content intended just for them, while others in the viewing space cannot see that target content.

Figure 1:
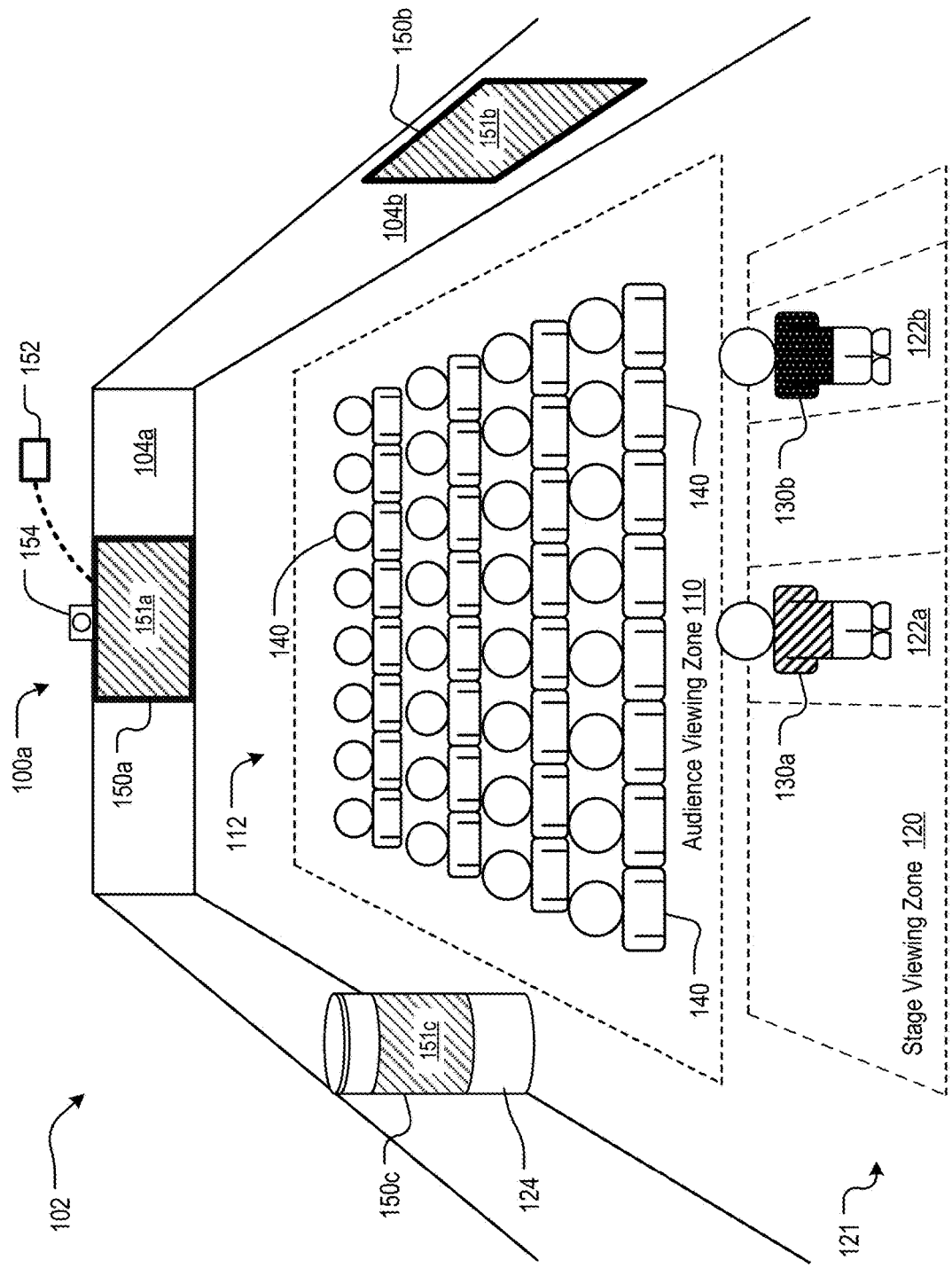
FIG. 1 illustrates an example installation of a multi-view (MV) display system for providing targeted instructional content, in accordance with embodiments of the present invention.

FIG. 1 illustrates an example installation of a multi-view (MV) display system for providing targeted instructional content, in accordance with embodiments of the present disclosure. In the illustrated example, the system 100 is implemented inside of a theater 102 having a performance area (e.g., a stage 121) in front of spectator area (e.g., an auditorium section 112) in which the audience members 140 are seated to view the performance on the stage 121. The MV system 100a includes a system controller 152 operatively coupled to an MV display 150a positioned on a back wall 104a of the theater 102. This MV display 150a includes a viewing surface 151a and is configured to display differentiated content to viewers within the theater 102.

When a presenter 130a standing on the stage 121 looks at the MV display 150a, the presenter 130a may see instructional content, such as, for example, the text from a speech the presenter 130a is giving to the audience, lines of dialog to be spoken by the presenter 130a in a stage performance, a cue to trigger an action to be carried out by the presenter 130a, or any other content that provides instruction, guidance, or information to the presenter 130a. At the same time, when an audience member 140 looks at the MV display 150a, that audience member 140 does not see the instructional content being displayed to the presenter 130a. Instead, the system controller 152 can cause the MV display 150a to display any other content or no content at all, such that the viewing surface 151a of the MV display 150a appears blank to the audience member 140. In some embodiments, the MV display 150a may be camouflaged or disguised to blend in with the surrounding environment such that it is not easily discerned to be an electronic display, but instead appears to be just a portion of the back wall 104a or other ornamental or architectural structure within the venue 102. In this way, although the viewing surface 151a of the MV display 150a is in plain view of anyone in the venue, the content displayed by the MV display 150a is only viewable by the targeted viewer (e.g., the presenter 130a). It would not be apparent to the other people in the venue that the viewing surface 151a is displaying any instructional content or even providing any function at all. As a result, the presenter 130a can maintain the appearance of presenting without external aids.

In some embodiments, the MV system 100 may be configured to display the instructional content to anyone positioned on the stage 121 and to display other content or nothing at all to anyone positioned in the audience. The system controller 152 may be programmed with a stage viewing zone 120, which could be, for example, the entire stage area, and an audience viewing zone 110, which may correspond, e.g., to the entire portion of the venue 102 in which audience members 140 may be positioned. In these embodiments, multiple presenters 130a-130b standing in the stage viewing zone 120 on the stage 121 will see the same instructional content being displayed on the viewing surface 151a, while simultaneously the audience members 140 seated (or standing) in the audience viewing zone 110 would not see the instructional content, but may see a blank surface if they look at the viewing surface 151a.

There may also be a desire to provide other people in the presence of the presenter 130a, such as audience members, cameras, crew, the press, passersby, or others, with cues, prompts, or content that are different from the instructional content to be provided to the presenter 130a. Additionally, in some cases it may be beneficial to show content to the audience that enhances, complements, reinforces, or translates the performance or speech, independent of the content intended for the performers or speakers.

In other embodiments, the MV system 100a is configured to display different instructional content to different zones in the venue 102. For example, the system controller 152 may be programmed with a first viewing zone 122a and a second viewing zone 122b. A first presenter 130a standing in the first viewing zone 122a will see displayed on the viewing surface 151a instructional content targeted to that presenter 130a, while a second presenter 130b standing in the second viewing zone 122b will see displayed on the viewing surface 151a instructional content targeted to that second presenter 130b different than the content displayed to the first presenter 130a. In this way, the first presenter 130a can see information primarily relevant to that presenter 130a (e.g., the lines of dialog to be spoken by the first presenter 130a), while the second presenter 130b simultaneously sees information primarily relevant to that presenter 130b (e.g., the lines of dialog to be spoken by the second presenter 130b). At the same time, audience members 140 in the audience viewing zone 110 may see nothing on the viewing surface 151a or may see content primarily relevant to the audience members 140 and not the presenters 130a-130b.

In some embodiments, the MV system 100 includes a sensing system 154 that can be used to identify the locations of (potential) viewers in a detection space. The detection space is the region in which sensing system 154 can detect/locate viewers and may comprise, for example, the entire interior of the venue 102, just the stage 121, or any desired region where target viewers may be located. In contrast with the example provided above in which the MV system 100 displays instructional content to zones 122a and 122b having a fixed location, in these embodiments, the sensing system 154 can identify one or more target viewers and continue to display the instructional content specific to each of those target viewers even if the target viewers move to different locations in the venue 102.

In the example shown in FIG. 1, the sensing system 154 can detect the locations of first presenter 130a and second presenter 130b on the stage 121. The system controller 152 can then cause the MV display 150a to display instructional content targeted for presenter 130a to the first viewing zone 122a and instructional content targeted for presenter 130b to the second viewing zone 122b. Then, if the first presenter 130a moves to a different location on the stage 122, the sensing system 154 will track the presenter 130a's movement and determine the presenter 130a's new location. The system controller 152 will then cause the MV display 150a to display instructional content targeted for presenter 130a to the viewing zone in which the presenter 130a is currently located and no longer display the instructional content to the first viewing zone 122a after the presenter 130a has exited that zone 122a. The tracking and movement of the viewing zone may be done on a continuous basis so that the presenter 130a will be able to continuously view his personalized instructional content on the viewing surface 151a as the presenter 130a moves across the stage. This can provide advantages over existing teleprompter systems, which have a fixed position and limited viewing range. If the presenter moves outside of the viewing range of the teleprompter, the presenter will no longer be able to see the text displayed on the teleprompter.

In other embodiments, the MV display need not be located on the back wall 104a of the venue 102. For example, an MV display 150b could be positioned on one of the side walls 104b of the venue. This configuration may be desirable if the back wall 104a is so far from the stage 122 or is partially obscured by pillars or other structures that the presenter 130 may have difficulty viewing the MV display 150a on the back wall 104a. This configuration may also be desirable if it is desired to display some content to the audience members 140 in the audience viewing zone 110. If the MV display 150a is positioned on the back wall 104a, the audience members 140 viewing the stage 122 would have to turn around to see the MV display 150a, which can be inconvenient or burdensome to the audience. When the MV display 150b is positioned on a side wall 104b, the audience members 140 may be able to more easily watch both the presenter 130a on stage 122 as well as the MV display 150b at the same time, or at least be able to switch their view from one to the other without the inconvenience of having to turn completely around.

In some embodiments, the MV display may be integrated into an architectural feature or other structure in the venue so as to enable the viewing surface to be in plain sight of the audience while concealing the fact that the viewing surface is a display and not merely an architectural feature. In the embodiment shown in FIG. 1, an MV display 150c is provided on the surface of a column 124 in the venue. The MV display 150c may be covered by a sheer fabric that permits the light projected from the MV display 150c to be viewable by the presenter, while also blending in with the surface of the rest of the column 124. Other locations are also possible, such as, e.g., the surface of a balcony, loge, or upper mezzanine. In other embodiments, more than one MV display may be used, and those MV displays may be located in any desired combination of locations within the venue.

Described herein are embodiments of a system for displaying targeted instructional content to one viewer in a viewing space such that other viewers in other locations of the viewing space are unable to observe the instructional content. As described above, the system may comprise an MV display and associated control, content, and sensing systems that can simultaneously present multiple versions of visual media that may vary by viewing location and may be used as a system with technologies and procedures that facilitate, e.g., calibration, content design, viewing location layout, tracking, sensing, and analysis.

One embodiment of an MV display may contain one or more projection elements, or directional pixels, each of which may be controlled so as to selectively project light, different colors, and different brightness levels, in multiple directions. As a result, the appearance of each projection element or pixel may vary depending on the viewer's location relative to the MV display. For example, one presenter observing the MV display might see an illuminated pixel, while the same pixel might not appear illuminated to another person simultaneously looking at the pixel from a different location. Alternatively, the pixel might appear blue to one person and simultaneously appear red to another person in a different location. An MV display may contain an array of these directional pixels, allowing the simultaneous projection of media that can be differentiated depending on viewing location. A similar functionality may be achieved by placing a lens or array of lenses over a display panel, giving each lens the capability of serving as a directional pixel or pixels presenting the different colors on the underlying display panel so that the light from each lens may have a different appearance depending on the viewer's location relative to the display. Other methods may also be used for transforming a conventional single color pixel into a directional pixel that has a different appearance depending on the angle/location from which it is viewed. These systems and others can be used in conjunction with a number of methods to display differentiated instructional content that is specific to location, individual, and other variables.

An MV display system can also present individualized content to audience members, cameras, crew members, directors, coordinators, producers, moderators, reporters, technicians, standbys, and others, so that only intended persons can view their specific versions of content. This can enable new applications, such as, e.g., interactive shows, exhibits, games, competitions, challenges, learning forums, meet-and-greets, photo opportunities, demonstrations, collaborations, and other experiences that may require more complex exchanges and interaction. All of these are by way of non-limiting examples.

Various embodiments of the present invention may combine one or more of the following elements: (1) a multi-view (MV) display system that may simultaneously present different versions of content that may vary depending on the location of the viewer relative to the MV display; (2) calibration procedures that may aid in assigning the selection of colors and brightness levels to be displayed by each pixel and directing those pixels so as to form multiple versions of content that may each be projected to a designated viewing zone; (3) methods, technologies, and interfaces for designing content for multi-view systems that optimize the content for specific applications, conditions, users, and/or other criteria; (4) methods, technologies, and interfaces for laying out and revising viewing zones that may correlate viewer location with various versions of display content; (5) methods, technologies, and interfaces that may enable inputting and changing content for display; and (6) sensor-driven systems that may direct the targeting of viewers, the layout and updating of viewing zones, and the selection and updating of content based on the information detected about the environment or location of the MV system. Also included are categories and examples of applications that may be achieved with these technologies, systems, procedures, interfaces, tools, and/or methods.

Figure 2:
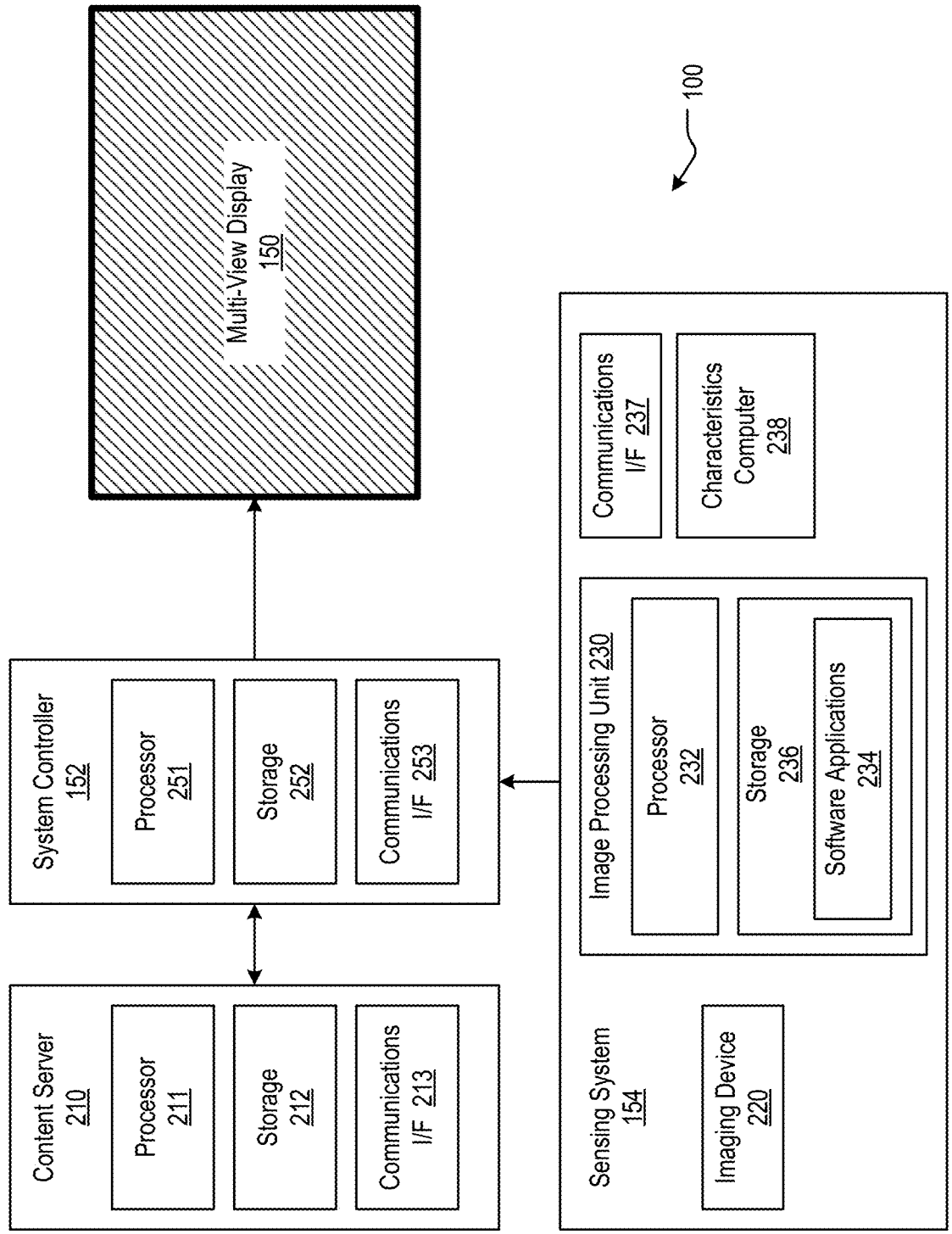
FIG. 2 is a block diagram of an MV system in accordance with embodiments of the present invention.

FIG. 2 is a block diagram of an MV system 100 in accordance with embodiments of the present invention. The MV system 100 comprises an MV display 150, a system controller 152, a sensing system 154, and a content server 210. In this embodiment, the viewer detection system is embodied as sensing system 154, which may comprise a machine/computer vision system that captures images or videos of the scene in the detection space. The captured images/videos are then used to determine the location of each viewer within the detection space.

Sensing System. FIG. 2 also includes a simplified block diagram of an exemplary sensing system 154. The sensing system 154 includes one or more imaging devices 220 for image acquisition, and an image processing unit 230 for performing various digital image processing techniques for extracting the desired information. Embodiments of sensing system 154 that include imaging device(s) 220 can provide the location of the viewer with respect to MV display 150a, in addition to providing presence detection (and, in some embodiments, viewer characterization). It will be appreciated that in such embodiments, in addition to or as an alternative to the imaging device, other devices/techniques can be used for locating a viewer (e.g., RF triangulation techniques, GPS, etc.).

The imaging device(s) 220 may include one or more digital cameras, including corresponding lenses and optional light sources that are designed, collectively, to provide the requisite differentiation for subsequent processing. In some embodiments, the digital camera may be a depth-aware camera, such as structured light or time-of-flight cameras, which can generate a depth map of what is being seen through the camera at a short range, wherein this data is then used to approximate a 3D representation of the image captured by the camera. In some other embodiments, the camera may be a stereoscopic camera, which utilizes two digital cameras whose relative positions are known to generate a 3D representation of the output of the cameras. In some further embodiments, one or more standard 2D cameras are used for image acquisition. In some additional embodiments, the imaging device comprises a radar system. Those skilled in the art will know how to make and/or specify and use various cameras, radar, or other imaging devices for the purposes of presence detection/location determination. Sensing system 154 can employ conventional (2D visible light) imaging, although other techniques, such as imaging various infrared bands, line scan imaging, 3D imaging of surfaces, or other techniques may suitably be used. Those skilled in the art will know how to select and use an appropriate imaging technique in conjunction with embodiments of the invention.

In some embodiments, imaging device 220 is combined with image processing unit 230, which includes processor 232 running software applications 234 (such as, e.g., image processing software) stored in non-transitory computer-readable data storage 236. In some embodiments, imaging device 220 is physically separated from the image processing unit 230, the latter of which is implemented on a separate computer (not depicted) or on system controller 152 running appropriate image processing software.

Any of a number of image processing techniques may suitably be used, including, without limitation, stitching/registration, morphological filtering, thresholding, pixel counting, image segmentation, face detection, edge detection, blob discovery, and manipulation, to a name a few.

In some embodiments, sensing system 154 further comprises a passive trackable object, which can be implemented in any suitable form factor, such as, e.g., a badge, wrist band, arm band, or eyeglasses. The passive trackable object can be carried by one or more presenters 130 and facilitates viewer detection by rendering the viewer more distinguishable from the surroundings than would otherwise be the case. In some embodiments, this is accomplished by imbuing the passive trackable object with certain surface characteristics (e.g., color, reflectivity, etc.) that render the object readily detectable by an imaging device and distinguishable from other objects in the detection space.

In some further embodiments, sensing system 154 comprises an active trackable object, which can be implemented in any suitable form factor that enables it to be easily carried or worn. Unlike the passive trackable object, which is detected in the images captured by the imaging device 220, the active trackable object can be detected using an RF or electromagnetic (EM) interrogating device/system, or the active trackable object can otherwise wirelessly transmit information to one or more receivers. For example, in some embodiments, the active trackable object is a smart phone that can transmit location information to one or more receivers.

Thus, in some embodiments, sensing system 154 incorporates an interrogation system instead of or in addition to machine vision systems. For example, in some embodiments, sensing system 154 includes a beacon, which detects the presence and identity of mobile devices, such as a smartphone, carried by the presenters 130. In such embodiments, one or more beacons may be positioned throughout the venue and communicate wirelessly to the presenters' mobile devices in each beacon's vicinity. Communication protocols include, without limitation, Bluetooth, Wi-Fi, or the like. In some embodiments, the mobile devices detect signals from the beacons and transmit information (e.g., beacon signal strength, etc.) to facilitate location determination. In some other embodiments, the beacons detect signals from the mobile devices and re-transmit them to one or more computers for processing to determine the identities and locations of mobile devices. Alternatively, a mobile device indoor location system or GPS can be used to detect the location of the mobile device users in the viewing space. The active trackable object thus serves as a proxy for the viewer.

In yet another embodiment using an active trackable object, viewers carry RFID tags (e.g., incorporated in a badge, wrist band, arm band, etc.) and RFID readers are placed through the environment of interest. The RFID readers detect the identity and location of each presenter's RFID tag as a proxy for the location of each presenter. The RFID tags can be active, utilizing internal power sources to communicate with RFID readers, or the RFID tags can be passive, utilizing radio frequency from RFID readers to power the circuitry to communicate with the readers. For the purposes of the present disclosure and the appended claims, a passive RFID tag is considered an active trackable object.

It is notable that active trackable objects can be used with or without machine vision systems in sensing system 154.

In a dynamic environment, a presenter may be in continuous motion; however, sensing system 154 might update each presenter's detected location periodically, rather than continuously. Thus, at a particular point in time, a presenter 130a might have moved since the last detection/location update. If the presenter 130a moves beyond the previously detected location, the presenter 130*a* might lose sight of the content being displayed to them by the MV display 150 (because viewing such content is location dependent). To address this issue, in some embodiments, sensing system 154 designates a personal viewing space around the presenter 130*a* at which to display the presenter 130*a*'s differentiated content. This permits the presenter 130*a* to move within the personal viewing space between location updates without losing sight of the differentiated content being displayed for the presenter's benefit. Furthermore, in some embodiments, sensing system 154 uses a model (e.g., location prediction software in the software applications 234) to predict the future location of a presenter given the presenter's past and current behavior, and displays the differentiated content for viewing at that predicted location. In some additional embodiments, the system uses an RFID reader that interrogates an RFID tag carried by a presenter. The identifying information obtained from the RFID tag can be associated with a "blob" (via "blob detection"). As long as sensing system 154 continues to track the blob, the system can continue to deliver differentiated content to the presenter.

Viewer Characterization System. In accordance with certain embodiments, a viewer characterization system may be used to establish a set of characteristics for each viewer. The set of characteristics established for each viewer is the basis for the instructional content that is generated for and targeted to each such viewer. In some embodiments, viewer characterization is performed, at least in part, using sensing system 154 and/or characteristics computer 238.

Viewer characteristics may be determined or estimated through "inferred identity" or "observable traits." With respect to inferred identity, in some embodiments, a database of characteristics of viewers may be pre-populated, such as obtained from social media, and tagged by a viewer's identity. Identity includes, but is not limited to, name, identification number or character sequence, phone number, and/or profile. In some embodiments, the system infers the identity of the viewer in the detection space and estimates the viewer's characteristics from the pre-populated database. In some embodiments, a smartphone beacon communicates with a viewer's smartphone, which is executing a social networking application. The beacon receives the social network profile identity of the viewer. In some embodiments, the beacon sends the profile identity to characteristics computer 238, which in turn communicates with a remote social networking database to determine or estimate the viewer's characteristics.

It is noted that this description is not an exhaustive list of possible characteristics or characterization methods, and alternative methods of viewer characterization may be used.

Content Generation System. Differentiated instructional content may be generated for each presenter by a content generation system, which can be, e.g., embodied as content server 210. In some embodiments, some of the tasks involved in content generation are performed by sensing system 154.

Content server 210 may include a processor 211, a non-transitory computer-readable storage 212 operatively coupled to the processor 211, and a communications interface 213.

Processor 211 may be a general-purpose processor that is capable of, among other tasks, executing an operating system and executing application software used in conjunction with embodiments of the invention. Processor 211 is also capable of populating, updating, using, and managing data in data storage 212. In some alternative embodiments of the present invention, processor 211 is a special-purpose processor. It will be clear to those skilled in the art how to make and use processor 211.

Storage 212 may comprise a non-volatile, non-transitory, machine-readable memory (e.g., ROM, EPROM, EEPROM, hard drive(s), flash drive(s) or other solid state memory technology, CD-ROM, DVD, etc.) that stores data (such as pre-generated content) and application software, which, when executed, enable processor 211 to generate or select instructional content for display on MV display 150. Instructions stored on the memory may embody any one or more of the methodologies or functions described herein. The instructions may also reside, completely or at least partially, within the main memory, within the processor 211 (e.g., within the processor's cache memory), or both, before or during execution thereof by the content server 210. The instructions may also reside in a static memory of the content server 210.

Accordingly, the main memory and the processor 211 of the content server 210 may also be considered machine-readable media (e.g., tangible and non-transitory machine-readable media). The instructions may be transmitted or received over a network via a communication interface, as described below.

Communications interface 213 enables communications with, for example and without limitation, system controller 152, and other computing devices on the Internet, such as to access news sites, social media sites, etc., via any appropriate medium, including wireline and/or wireless, and via any appropriate protocol (e.g., Bluetooth, Wi-Fi, cellular, optical, ultrasound, etc.). The term "communications interface" is meant to include any electronic communications technologies and, as appropriate, various supporting equipment, such as communications ports, antennas, etc. Instructional content relating to the information received from other computing devices, such as news websites or social media websites, can then be selectively displayed to one or more viewers without being visible to other viewers.

Although the illustrative embodiment depicts a single content server 210, in some embodiments, the system 100 includes multiple content servers 210. Furthermore, in some embodiments, the functionality of content server 210 is distributed among other elements of the system 100, such as system controller 152.

Content generation includes selecting from (1) pre-generated content or (2) generating the content in real time. The pre-generated content may comprise, for example, the text of a speech to be given by the presenters, dialog for a performance by the presenters, and content providing cues or other instructions for the presenters. The content generated in real time may include, for example, information about the audience or other event occurring while the presentation is being made. The cue can take any form, e.g., a detailed textual description of an action or activity, an animation or video of an action or activity, a detailed graphical depiction of an action or activity, a simple graphical image (e.g., an icon, arrow, pointer, single light, multiple lights, colored lights, light or images projected at a predefined rate or pattern), instructional content relating to timing (e.g., a light or images pulsing at a desired rate or pattern), or other media.

Content Presentation System. After generating the personalized instructional content, that content is displayed to the presenter(s) 130 or other desired viewer using the MV display 150 and the system controller 152. As described above, a multi-view display is capable of displaying different images to different viewers based on a difference in viewing location. In contrast, a traditional display, such as a conventional LCD, LED, plasma, or projection display, displays the same image to all viewers, while a multi-view display is capable of displaying different images to different viewers simultaneously.

The MV display 150 described above includes one or more projection elements that emit light of different color and brightness at different angles. Similarly, each projection element may simultaneously direct light in some directions, and show no light in other directions. In some embodiments, each projection element includes a light source, an imager, and a lens. The light source illuminates the imager and the imager filters or directs the light through the lens. The lens is capable of directing light that is received from different locations of the imager in different directions. Examples of suitable imagers include, without limitation, digital micromirror devices, liquid crystals, light emitting diodes, and/or liquid crystal on silicon (LCOS). The light source illuminates the imager and the imager filters or directs the light through the lens.

Each projection element can be considered to be a single multi-view pixel of the display, wherein a full graphic multi-view display is formed from an array of such projection elements. In some embodiments, each projection element is controlled by its own processor. In other embodiments, a processor controls plural projection elements, but fewer than all of the elements of the display. In some embodiments, all of such processors in the MV display are connected via a network (e.g., Ethernet, Infiniband, 12C, SPI, Wi-Fi, etc.), or, more generally, a communication channel (e.g., HDMI, etc.).

In some implementations of multi-view pixels, a multi-view pixel can be implemented using a projector similar to a conventional image projector. A conventional image projector projects a plurality of narrow light beams toward a projection screen. In contrast, a multi-view pixel is capable of controllably directing light (each controllable beam referred to herein as a "beamlet") in a plurality of directions. The color and brightness in different directions, corresponding to different beamlets, can be different. A multi-view pixel is similar to a conventional image projector in that it emits a number of beamlets, but the beamlets are not intended for forming an image on a screen. Rather, they are intended to fall upon the eyes of a viewer. Each multi-view pixel, from a viewer's perspective, appears to be a light source of the color and brightness of the beamlet that is projected by that pixel onto the viewer, even if the projection would be too dim for any image to be visible if projected onto a nearby surface. As a consequence, the appearance of each multi-view pixel from the perspective of a viewer is dependent upon the angle at which the viewer views it. In other embodiments, the multi-view pixels can be implemented using a plurality of lenses positioned over a display panel, with each lens operating as a single multi-view pixel. In other embodiments, any of a variety of technologies capable of achieving the desired effect of sending different visual information in different directions from the same pixel, or array of pixels, or display, may be used for the MV display.

Generally, the intended viewer is human, but optical devices such as cameras can also be used with a multi-view display, and it is also possible to utilize multi-view displays wherein intended viewers might be non-human viewers such as animals, cameras or other image-capturing entities.

In a multi-view pixel, each beamlet's light can be controlled independently of the light of other beamlets. For example, and without limitation, the light intensity and/or color of an individual beamlet might be controllable independently of the intensity and/or color of the light of other beamlets. Other parameters of beamlet light might also be controlled, such other parameters comprising, for example, spectral composition, polarization, beamlet shape, beamlet profile, overlap with other beamlets, focus, spatial coherence, temporal coherence, etc., to name just a few.

A viewer that looks at a multi-view pixel sees the light of one or more beamlets; in particular, the viewer sees the light of those beamlets that are emitted by the multi-view pixel and fall upon a viewer's pupil. The viewer perceives the multi-view pixel as glowing with the combined light of those beamlets. As with conventional pixels, a multi-view pixel can have a variety of shapes, as perceived by the viewer looking at the multi-view pixel. In this manner, the color and brightness of each pixel, or the presence of detectable light or no-light, may depend on the location of the viewer relative to the MV display. If an MV pixel is projecting the color red to the right, and the color green to the left, individuals simultaneously observing the same pixel may each see a different color depending on whether they are standing to the left or the right of the MV display. Likewise, a pixel may shine light in one direction but not another, so a person standing in one place sees a light, while a person in another place only sees darkness.

Figure 21:
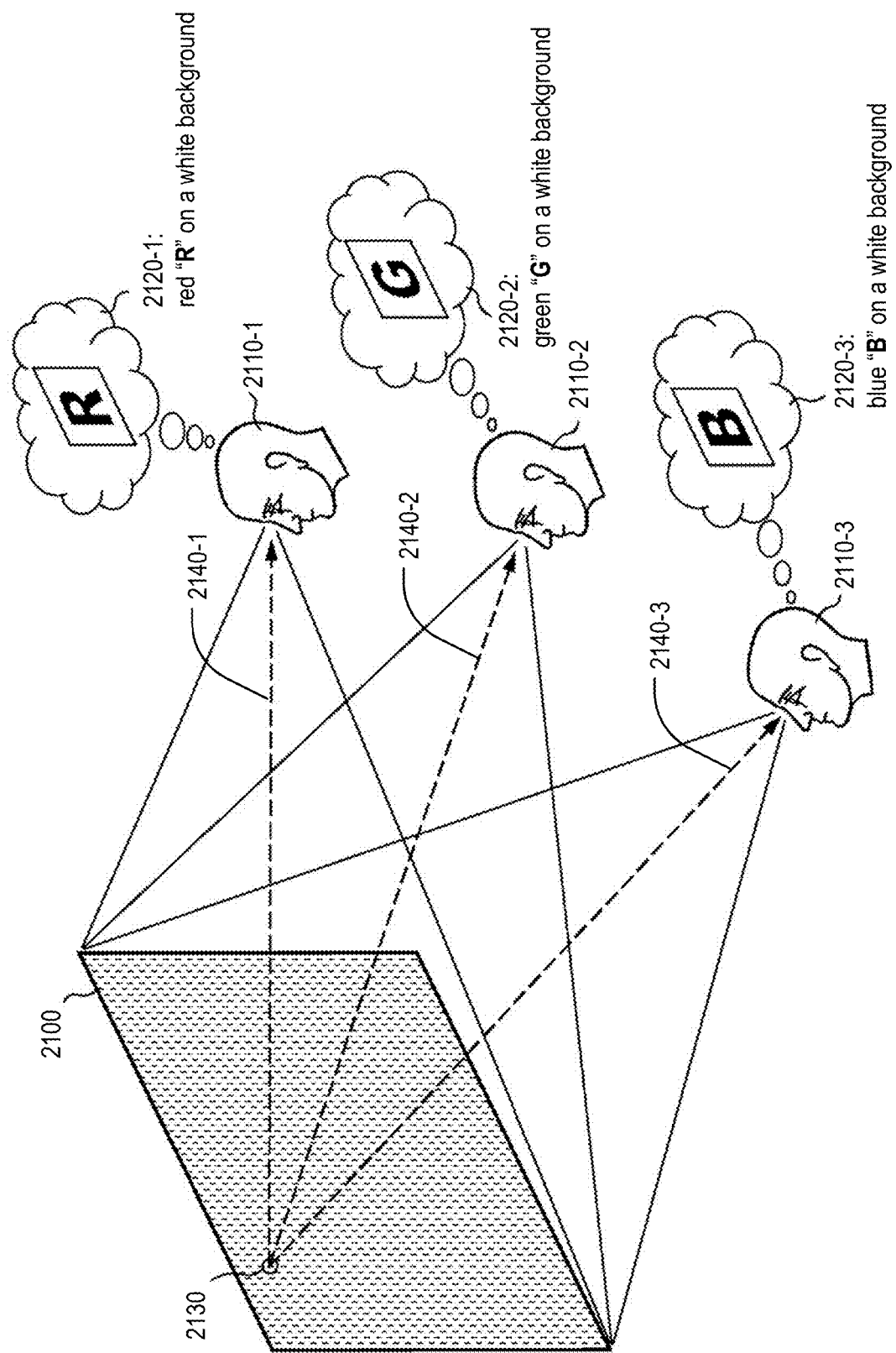
FIG. 21 illustrates the functionality of a multi-view display in accordance with embodiments of the present invention.

FIG. 21 illustrates the functionality of a multi-view display. In the figure, multi-view display 2100 is viewed simultaneously by three viewers 2110-1, 2110-2, and 2110-3. The three viewers 2110-1, 2110-2, and 2110-3 are positioned at three distinct positions from which the multi-view display 2100 is visible. Each of the three viewers 2110-1, 2110-2, and 2110-3 sees a different image on the display surface of the multi-view display 2100. The three different images seen by the three viewers are depicted in FIG. 21 as images 2120-1, 2120-2, and 2120-3. In particular, viewer 2110-1 sees a red letter "R" on a white background, viewer 2110-2 sees a green letter "G" on a white background, and viewer 2110-3 sees a blue letter "B" on a white background.

For each of the three viewers 2110-1, 2110-2, and 2110-3, the experience of viewing the MV display 2100 is similar to viewing a conventional display, such as a standard television set, but each viewer sees a different image on the display surface of the multi-view display 2100. Each viewer is, possibly, not even aware that other viewers are seeing different images. Hereinafter, the term "viewing space" will be used to refer to the range of possible positions for viewers to experience the multi-view display functionality.

The functionality of multi-view display 2100 is based on the functionality of the individual multi-view pixels of the multi-view display. One such multi-view pixel is depicted in FIG. 2100 as multi-view pixel 2130. The functionality of the multi-view pixel is best understood by comparison with the functionality of a conventional pixel in a conventional display. A conventional pixel is simply a light source that emits a particular type of light in all directions of emission. For example, in a conventional television set, a pixel is typically implemented with a material that glows when electrically excited. The glow is typically in one of the three primary colors. The glowing material emits colored light uniformly in all directions.

In a scenario like the one depicted in FIG. 21, if the MV display 2100 were a conventional display, the light emitted by each conventional pixel would reach the eyes of the three viewers with the same color and approximately the same brightness. All three viewers would see the same image on the display surface as a collection of glowing conventional pixels.

In contrast to a conventional pixel, multi-view pixel 2130 is able to emit different light in different directions. In each direction, light of a particular type is emitted as a narrow beam, referred to as a beamlet. FIG. 21 depicts three beamlets 2140-1, 2140-2, and 2140-3, wherein beamlet 2140-1 is aimed at the eyes of viewer 2110-1, beamlet 2140-2 is aimed at the eyes of viewer 2110-2, and beamlet 2140-3 is aimed at the eyes of viewer 2110-3.

In the illustrative example of FIG. 21, to avoid clutter, the beamlets are depicted as simple dashed lines with an arrowhead indicating the direction of propagation of beamlet light; however, beamlets can have any size and shape. For example, and without limitation, beamlets might have a shape similar to the beam from a searchlight, although, of course, much smaller; but, in general, the optimal size and shape of beamlets depends on the application, environment, and construction of the multi-view display. Multi-view displays for different uses can have different beamlet sizes and shapes. In some embodiments, different beamlet sizes and shapes might even be found together in the same multi-view display, or even in the same multi-view pixel.

In the scenario of FIG. 21, each beamlet is wide enough such that both eyes of each viewer can be expected to be within the same beamlet. Therefore, both eyes are expected to see the same light (e.g., the same color and brightness). However, multi-view displays can exist wherein beamlets are small enough that distinct beamlets reach the two distinct eyes of a viewer, such at each of a viewer's eyes sees a different color and/or brightness.

In the illustrative example of FIG. 21, the three beamlets 2140-1, 2140-2, and 2140-3 each carry light corresponding to the brightness of the image that each viewer is intended to see. For example, as noted above, viewer 2110-2 sees a green letter "G" on a white background, while viewer 2110-3 sees a blue letter "B" on a white background. Correspondingly, there are areas of the display surface where viewer 2110-2 is intended to see the color white while viewer 2110-3 is intended to see the color blue. If multi-view pixel 2130 lies in one such area, beamlet 2140-2 will carry white light, while beamlet 2140-3 will carry blue light. As in conventional displays, viewers perceive images as a collection of pixels of various colors and brightness. With multi-view display 2100, the ability of multi-view pixels to emit different beamlets in different directions makes it possible for different viewers to perceive the same multi-view pixel as having different colors and different brightnesses, such that each viewer sees the collection of multi-view pixels as a different image.

Figure 22:
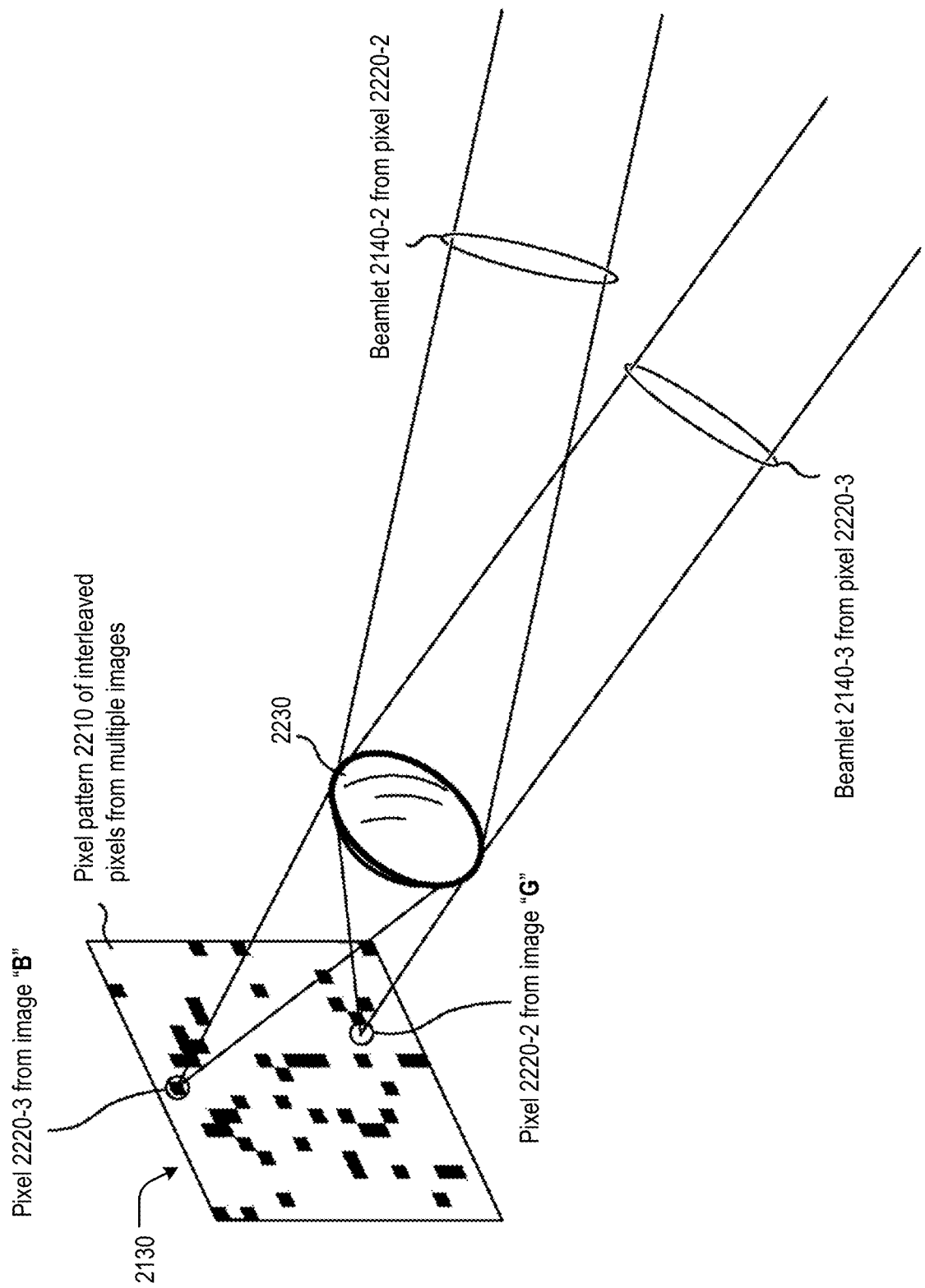
FIG. 22 depicts an illustrative implementation of a multi-view pixel in accordance with embodiments of the present invention.

FIG. 22 depicts a possible illustrative implementation of multi-view pixel 2130. The multi-view pixel comprises a pixel pattern 2210. In FIG. 22, pixel pattern 2210 is a rectangle with 400 conventional pixels arranged in a 20×20 array. This 20×20 array enables the multi-view pixel to emit as many as 400 different beamlets. Each beamlet originates as a pixel in pixel pattern 2210.

Lens 2230 implements the conversion of a pixel in pixel pattern 2210 into a beamlet. For example, pixel 2220-2 is the pixel that is converted into beamlet 2140-2. As already noted, beamlet 2140-2 is intended to carry white light. Accordingly, pixel 2220-2 may be a conventional pixel that comprises a material able to glow, emitting white light when electrically excited with an appropriate electrical excitation. In the illustrative implementation of FIG. 22, pixel 2220-2 is electrically excited and emits white light in all directions. Lens 2230 collects a sizable fraction of the emitted white light and collimates it into beamlet 2140-2. Similarly, pixel 2220-3 is the pixel that is converted into beamlet 2140-3, and is intended to carry blue light. Correspondingly, pixel 2220-3 may be a conventional pixel that comprises a material able to glow, emitting blue light. In the illustrative implementation of FIG. 22, pixel 2220-3 is emitting blue light in all directions. Lens 2230 then collects a sizable fraction of the emitted blue light and collimates it into beamlet 2140-3.

The depiction of the single multi-view pixel 2130 in FIG. 22 is intended to be representative of each the multi-view pixels in multi-view display 2100 as well as of similar multi-view pixels in other multi-view displays. Accordingly, this disclosure will refer to "the pixel pattern 2210" or "the lens 2230" of a multi-view pixel other than multi-view pixel 2130 in order to refer to the equivalent structure of that other multi-view pixel.

The depiction of multi-view pixel 2130 presented in FIG. 22 is similar to the principle of operation of a typical image projector. Indeed, the functionality of the multi-view pixel 2130 may be similar to the functionality of an image projector, with some important differences:

Difference 1: An image projector is typically used for projecting an image onto a screen for viewing. It is desirable for the projected image to be as sharp as possible. Accordingly, a projector's lens is adjusted for best focus. In a multi-view pixel, such an adjustment would result in beamlets that are very small at the focal distance. This is not usually desirable because the optimal size of beamlets depends on the desired multi-view experience provided to viewers. For example, and without limitation, if all viewers in a particular area of a room are intended to see the same image, this can be accomplished via beamlets that are each as large as that area of the room. Also, an ideally-focused projector creates non-overlapping dots on the screen. In contrast, it might be desirable for adjacent beamlets to overlap somewhat, so as to avoid gaps in the viewing space.

Difference 2: An image projector typically has non-overlapping pixels of different colors. Usually, each pixel emits only one of the three primary colors. Correspondingly, the projected image consists of non-overlapping dots wherein each dot is of one of those colors. The visual perception of a full color palette is achieved because, from a distance, the individual dots are not resolved by the human eye, and the three primary colors blend together into a perceived color that depends on the relative strength of the primary colors. In contrast, a single beamlet of a multi-view pixel might carry the full palette of possible colors. For example, beamlet 2140-2 is intended to carry white light because the background of image 2120-2 is white. To allow the background of image 2120-2 to be any color, beamlet 2140-2 should be able to carry light of any color. Therefore, in the illustrative implementation of FIG. 22, pixel 2220-2 should be able to emit light of any color.

In alternative implementations, beamlets might be sized large enough to have substantial overlap, such that at each position in the viewing space, three or more beamlets are simultaneously visible from the same multi-view pixel or from nearby multi-view pixels. In such implementations, it might be acceptable to have monochromatic (single-color) beamlets, because the relative strength of overlapping beamlets can be adjusted to yield a desired color perception.

Difference 3: An image projector must emit light bright enough for a visible image to form on the screen. Indeed, a person that walks in front of a projector and looks toward the projector usually finds the brightness to be unpleasantly bright and objectionable. In contrast, a viewer of a multi-view display may be looking directly at the light emitted by the multi-view pixels. The light should be bright enough to be visible, but not so bright as to be objectionable. As a result, if a multi-view pixel were used as a conventional projector to project an image onto a screen, the image on the screen can be expected to be inadequately faint. The resulting projected image is likely to be virtually difficult to detect in normally-lighted environments.

Figure 23:
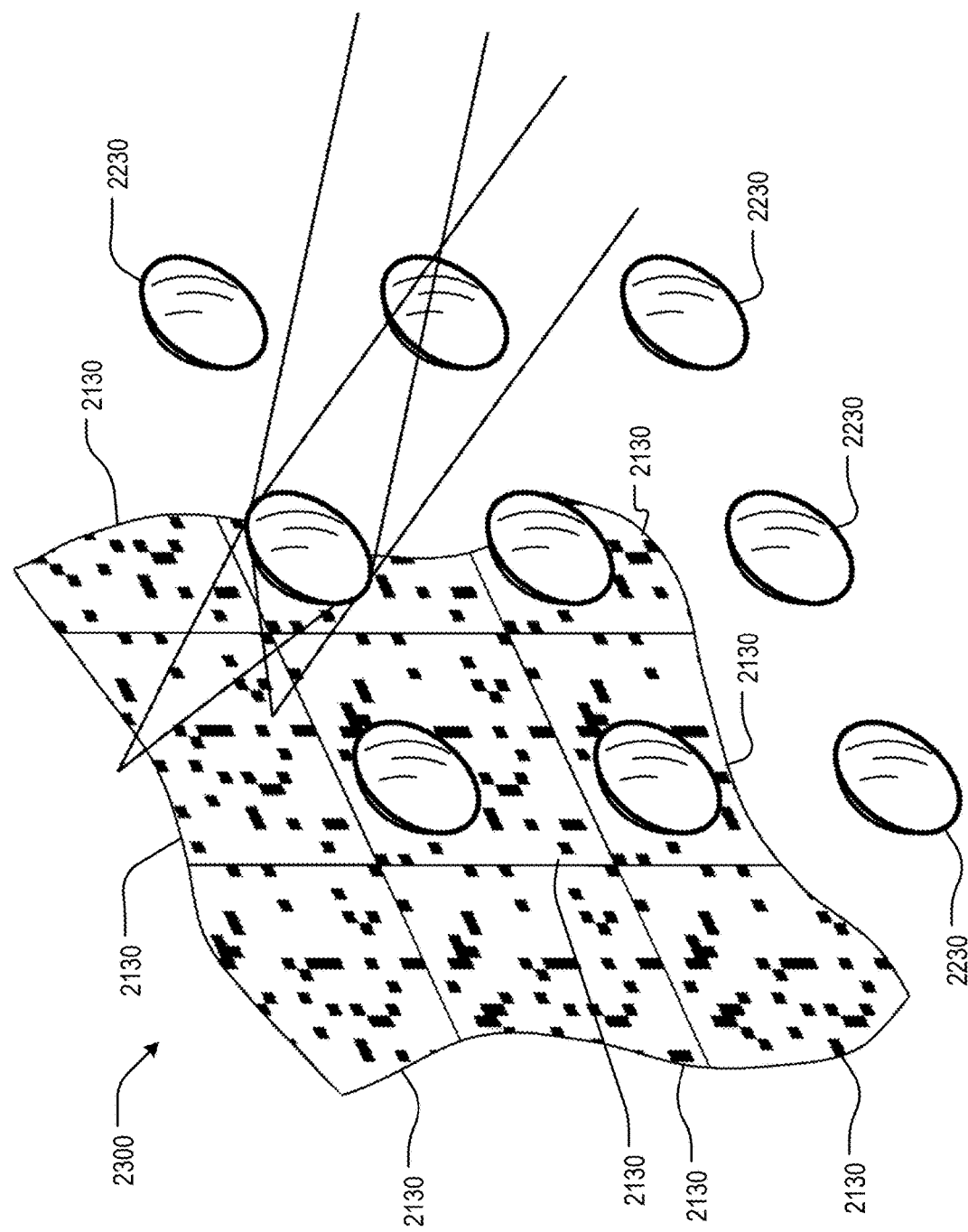
FIG. 23 illustrates an example array of multi-view pixels in accordance with embodiments of the present invention.

FIG. 23 illustrates how multiple multi-view pixels might be assembled together as an array to form a multi-view display. In a conventional display, a regular (usually rectangular) array of adjacent pixels is typically used to form images. In a multi-view display in accordance with the illustrative example of FIG. 23, the multi-view pixels 2130 are also arranged in a rectangular array 2300, a portion of which is shown in FIG. 23. The pixel patterns 2210 of the multi-view pixels 2130 are juxtaposed in a rectangular array, and corresponding lenses 2230 are positioned in front of the associated pixel pattern 2210, so that the lenses 2230, too, are arranged in a rectangular array.

A viewer of the multi-view display 2100 such as, for example, viewer 2110-1, looking at the array of lenses, may see one beamlet 2140 from each of the lenses 2230. In other words, each lens 2230 may appear as a disc that emits the light of the beamlet that reaches the viewer 2110-1 from that multi-view pixel. From a distance, the collection of discs is perceived by that viewer 2110-1 as an image, much the same way as the collection of conventional pixels of a conventional display is perceived as an image, when viewed from a distance. Alternatively, the multi-view display 2100 might be for displaying numbers or characters as patterns of dots wherein each disc is a dot.

In FIG. 23 the lenses 2230 are shown as floating in space; the support structure for the lenses 2230 is not shown. In practice, the lenses 2230 might be supported, for example, and without limitation, by a dark sheet that, in addition to mechanical support, would also provide an opaque background and would block stray light from the pixel patterns 2210. From a distance, the light from the pixel patterns 2210 would then only reach the viewer's eyes via the beamlets that pass through the lenses. The viewer would see the lenses as illuminated discs on the dark background of the dark sheet. A mechanical support for the lenses is not shown in FIG. 23 in order to better illustrate the arrangement of pixel patterns 2210.

In electronic displays, pixels are usually arranged in a rectangular array. To prepare an image for displaying, the image is typically "rasterized", meaning that the image is subdivided into a plurality of small rectangles that match the geometry of the pixel array. The average color and brightness of each small rectangle determines the color and brightness of a corresponding pixel. In modern electronic displays the accuracy with which pixels are positioned in the pixel array is excellent, such that the correspondence between small rectangles and pixels can be derived computationally, based on the nominal geometry of the array, without the need to know in advance any additional parameters specific to the display unit that will be used for showing the image. With most conventional displays, it is also not necessary to know in advance how and where the display will be installed.

With a multi-view pixel such as multi-view pixel 2130, it is reasonable to expect that the pixel pattern 2210 can be made as, for example, and without limitation, a rectangular array of conventional pixels with the same degree of accuracy that is feasible for the abovementioned conventional displays. This could be expected to result in a pattern of beamlets wherein the relative geometry of the beamlets can be accurately derived from the geometry of pixel pattern 2210. This, however, might not be easy to accomplish. Beamlet geometry is altered by any imperfections in lens 2230, and the pattern of beamlets, as they reach locations in the viewing space, depends significantly on the geometry of the viewing space itself and on the position and orientation of the multi-view pixels relative to the viewing space.

Although FIG. 23 depicts distinct multi-view pixels 2130 as being identical to one another and identically oriented, in other embodiments, it might be desirable for a multi-view display to have multi-view pixels of different types. Also, it may be advantageous for multi-view pixels to be oriented differently in different areas of the display surface. For example, multi-view pixels near the center of the display surface could be oriented such that their beamlets propagate symmetrically outward, relative to the plane of the display surface, while multi-view pixels near the edge of the display surface could be oriented such that beamlets propagate more toward the center of the display. This might be done in order to achieve optimal coverage of the viewing space. Such differential orientation could be accomplished by changing the orientation of individual multi-view pixels placed on a flat surface, or it might be accomplished by making the display surface curved (e.g., by arranging the multi-view pixels such that all of the lenses in the array are not coplanar). In other situations, such as in the case of multi-view displays for irregular surfaces and other similar applications, the orientations of the multi-view pixels might be in very non-standard configurations that can be difficult to characterize a-priori. In all such cases, it might be difficult to know a priori the exact orientation of each multi-view pixel. Embodiments of the present invention can advantageously provide a calibration process for learning the orientation of all beamlets of all the multi-view pixels.

The operation of the MV display is managed via system controller, such as system controller 152. The system controller 152 directs the operation of the multi-view display 150. For example, in some embodiments, system controller 152 will fetch content from content server 210 and then direct the operation of the MV display 150, causing the MV display 150 to display a specific image to a specific location in the viewing space. As depicted in FIG. 2, system controller 152 includes a processor 251, a non-transitory computer-readable storage 252 operatively coupled to the processor 251, and a communications interface 253.

Communications interface 253 may be similar to communications interface 213 and may enable communications with content server 210 and other devices. Although the illustrative embodiment depicts a single controller 152, in some embodiments, the functionality of controller 152 is distributed among several devices.

To provide the various forms of desired content to each of their corresponding viewing zones, a calibration procedure may be used to determine the colors and brightness needed for each pixel, as well as the direction each color and level of brightness should be projected from each pixel. The calibration may be achieved with the aid of a camera or cameras mounted on, or located near, the MV display, or through some other method.

A procedure may also be used for laying out viewing zones to designate which sightlines in which areas will see specific versions of content. This procedure may be aided by use of a camera or cameras on or near the MV display 150 that relay the areas and vantage points from which the MV display 150 may be seen. In this way, the viewing zone designer may take into account environmental criteria. An interface may be created for use on a computing device, such as a tablet computer, laptop, smartphone, smartwatch, controller, or other device that allows for, e.g., an initial mapping of viewing zones and assignment of various versions of content matched to each viewing zone, and for timed, triggered, or real-time re-mapping of zones.

Each version of content may be designed not only to deliver the subject and information intended for each viewing zone, but to compensate for viewing distance, angles, blockage, brightness, and other considerations. As conditions or preferences change, the design of the content can be adjusted real-time, or based on triggers, schedules, sensors, or observation. For instance, if the intended viewer of content (e.g., presenter 130a) in a specific viewing zone (e.g., first viewing zone 122a) moves further away from the MV display 150a, the font size of the text being displayed to the presenter 130a on the viewing surface 151a can be increased for improved visibility. In addition, if lighting conditions change, the brightness, contrast, or color selections of the text or other images displayed by the MV display 150a may be adjusted to maintain a consistent appearance.

Persons using the content (e.g., presenter 130a) or another individual (e.g., a director or staff member) may change or adjust the instructional content on the MV display 150a through the use of an interface, such as the interface described above with respect to the view designer. Alternatively, those individuals might implement the change by performing actions, giving signals, making vocalizations, or through some other means or methods. In this manner, different forms or selections of content might be accessed or reviewed. Content may also be determined, adjusted, and refreshed using triggers, timers, sensors, observation, or other methods.

Sensing system 154 may be used in numerous ways to automatically control viewing zone layout, content selection, content design, and data gathering. For example, sensing system 154 may be used to detect and track the movement and current location of the intended viewer of a specific version of content, and adjust the viewing zone for that content accordingly. As described above, a performer (e.g., presenter 130a) moving about on the stage 121 might be tracked and the viewing zones adjusted so the performer's script remains visible on the MV display 150a from whatever position the performer is occupying at a given moment. As multiple performers (e.g., presenters 130a-130b) continually change position on the stage 121, sensing system 154 may be used to ensure that each performer can view specific lines of dialog or other instructional content that cannot be seen by the audience or other performers, even if the performers switch positions on stage.

In some embodiments, the sensing system may be used to determine when to change content based on speech recognition. For example, a presenter 130a giving a speech by reading off the MV display 150a might automatically see on the MV display 150a a new page of the speech immediately after an audio sensor hears the last line on the current page or as the presenter's speech is approaching the last line.

In some embodiments, the sensing system may evaluate lighting, distance, and other criteria to adjust content for enhanced visibility.

The sensing system might also provide feedback to viewers that can aid in adjusting the speech or performance presented by that viewer. The instructional content shown on the MV display might include an analysis of audience motion and movements, attention level, reactions, expressions, eye focus, audio levels, specific words or comments spoken, cell phone usage, texting, social media postings, or other variables. Metrics may be established to indicate when an audience is getting bored and restless, or expressing other reactions—positive and negative—and the conclusions or guidance based on these metrics might be displayed to the viewer. The content may be displayed in any desired way, such as, e.g., in a dashboard format in which multiple variables or parameters are simultaneously displayed using one or more of colors, graphics, flashing lights, text, gauges, and charts.

In some embodiments, other forms of input may be used, e.g., by the content server 210, to influence the instructional content shown on the MV display 150a or be incorporated into the instructional content. The instructional content may include real-time or near real-time commentaries or blogs from critics, reporters, or audience members. For example, if a commentator is criticizing the direction of a speech in a livestream or blog, those criticisms might appear on the MV display 150a so the presenter 130a can change the topic or direction of the speech, or to respond to the criticism. In other embodiments, real-time or near real-time news items, events, or sport scores or plays, may be presented on the MV display 150a so the presenter 130a can reference that real-time information in the presenter's speech, and thereby appear more informed and up-to-date with current events. Ongoing feedback to the presenter 130a may be provided by the audience or staff or other associates of the presenter 130a positioned in the auditorium 112 among the audience members 140. This feedback may be transmitted to the content server 210 for display on the MV display 150a using personal computing devices or other devices for receiving user input.

The capacity for making real-time adjustments to content being displayed by the MV display and their associated viewing locations can further expand applications by making a speech or performance more connected and responsive to the audience, environment, and other variables.

MV displays may be utilized in conjunction with regular conventional computer displays, screens, projections, and other media delivery technologies to provide more immersion, content, and context while retaining customization, personalization, and other benefits.

Multi-view displays can also be configured into many different shapes, forms, sizes, and configurations to better aid visibility to targeted viewers, concealment from others who are not targeted viewers, aesthetic appeal, functional impact, adaptation to the surrounding environment, and other considerations. For example, directional pixels might be incorporated into organic shapes, such as, e.g., a rock face or tree trunk; into decorative elements, such as, e.g., murals or sculptures; around geometric shapes, such as, e.g., a sphere, oval, or ribbon; into architectural and landscape features, such as, e.g., walls, ceilings, floors, pools, fountains, furnishings, columns, steps, soffits, bollards, parapets, rooflines, and building outlines; or into traditional media forms such as, e.g., billboards and scoreboards—all by way of example. In this manner, multi-view displays can be incorporated into any environment.

In situations where it is desired to use multi-view displays to display cues and prompts, the ability to incorporate the MV displays into their surroundings increases the ability to conceal those MV displays from audiences, all while making them more visible to targeted viewers. For example, an MV display could be incorporated into the entire back wall of a theater, providing highly visible cues/prompts that can only be seen by performers on the stage, while showing pleasing visual effects or other content to anyone looking at the same wall from the audience.

MV displays can also be configured around or adjacent to the lens of an image capture device (e.g., a digital camera)

recording a speaker, so the speaker can appear to look directly into the camera while reading text or viewing other content on the display. The camera lens can be incorporated into the MV display so it is well camouflaged, and content can be shown on the display to elicit desired expressions or reactions from the subject. This configuration may enable the filming or photographing of a child without inducing a feeling of self-consciousness caused by the knowledge of being filmed because the content on the display can distract the child from the lens or may conceal the lens altogether. As a result, the child might smile or laugh naturally at funny content presented to the child on the MV display. At the same time, an adult might read different content directed to that adult, enabling the adult to appear to look directly into the camera without feeling pressure from having the camera pointed at them. In addition, numerous users can all look at the same camera at the same time and see their own script, "motivation," or other targeted content on the MV display.

In accordance with embodiments of the present invention, MV systems may be used to assist the hearing impaired or with foreign language translation. The ability to simultaneously show different versions of content to different people in sight line of the same MV display means language translations and captions for the hearing impaired can be provided only to those individuals who need that assistance. Others in the audience with no need to view such information will not see those translations and captions, thereby eliminating the distraction of captions to those who do not need or want them. In some embodiments, individuals may request captions in a specific language, or might ask for a particular size or style of hearing-impaired captioning, by inputting their needs and location on a personal device, or through some other user input device. Alternatively, another person in the same location or observing remotely might identify those in need of assistance and make the assignment for special captioning to a viewing zone specific to a single targeted person or group of people. Captions might also be provided to those within sight of an MV display, but out of hearing range from the speaker or performer.

The following are descriptions and illustrative examples of how multi-view displays might be applied to cue performers, speakers, teachers, and others, and might generally be used to enhance and enable: acts, advertising, assemblies, bands, broadcasts, challenges, choirs, classes, competitions, concerts, conferences, conventions, debates, demonstrations, events, exhibitions, family gatherings, filmings, funerals, gambling, games, gatherings, instructions, lectures, legal proceedings, life events, marketing, marriages, meet-and-greets, meetings, orations, orchestras, parades, performances, plays, political events, presentations, press events, productions, rallies, recitals, recruiting, research, scavenger hunts, seminars, sermons, services, shows, special occasions, speeches, sporting events, tapings, testing, tours, treasure hunts, trials, weddings, and other types and categories of users, uses, and experiences. These are non-limiting examples and are not intended to serve as an exhaustive list of possible features or applications, or restrict the scope of the claimed subject matter.

EXAMPLE 1

Using MV Displays to Cue/Prompt Speakers and Performers

As described above with respect to FIG. 1, an MV display 150a can be used to show one version of instructional content to some viewers (e.g., presenters 130a-130b), while showing different versions of content, or no content at all, to other persons (e.g., audience members 140) within sightlines of the viewing surface 151a of the MV display 150a. This is achieved by assigning the various versions of content to subsets of locations (e.g., viewing zones 110, 120, 122a, 122b) within sight of the MV display 150a. MV displays can be used to cue performers by showing the content to assist the performer with the performance, speech, or other presentation only to the viewing zone occupied by the performer. Persons looking at the MV display from all other viewing zones—areas not occupied by the performer but within sight of the MV display—would not be able to see the content intended for the performer.

EXAMPLE 1A

Two Viewing Zones

The primary user sees a script or other content on an MV display, while an audience looking at the same display cannot see the content.

Figure 5:
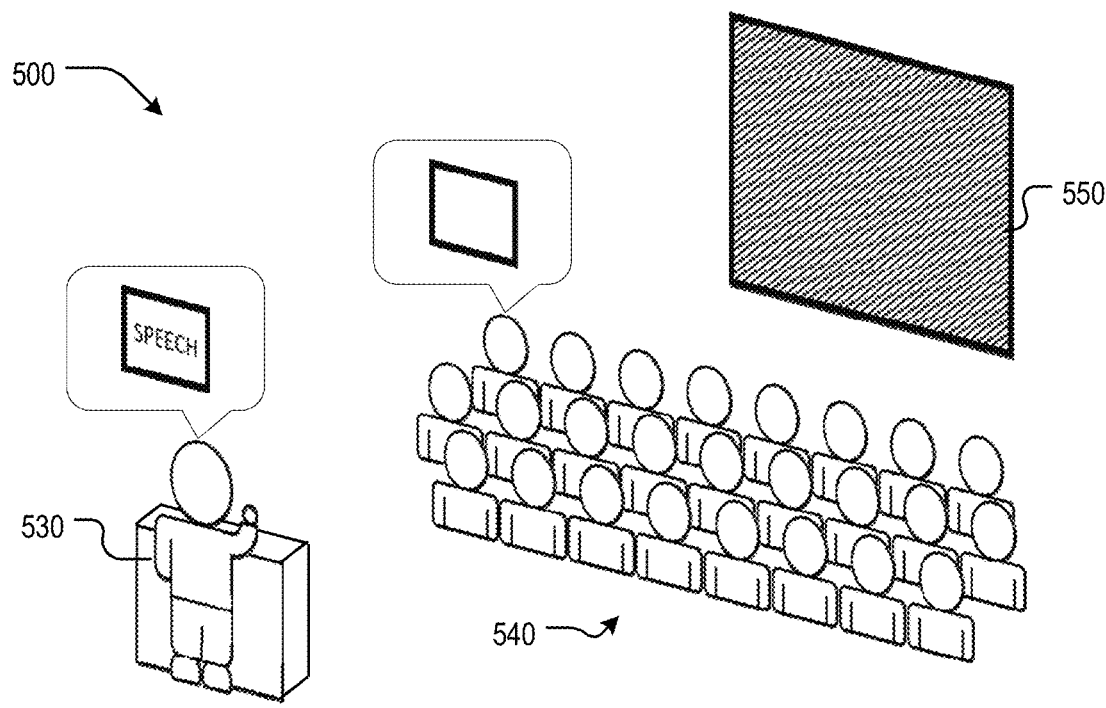

FIG. 5 illustrates an example 500 of a basic application in which a politician 530 is standing behind a podium surrounded by an audience 540 of the public, press, and camera crews. An MV display 550 is positioned within the politician's sightline. The area in proximity to the podium is designated as viewing zone one and is linked to the content that contains the politician's speech. The design of the content is optimized for distance, lighting conditions, and other criteria specific to the desires of the politician. Only someone viewing the MV display 550 from the area near the podium will be able to see the speech on the MV display 550. A second viewing zone is assigned to the area populated by the audience 540, including the public, press, and cameras. Anyone looking at the MV display 550 from viewing zone two might see a blank screen, or a screen showing neutral or camouflaging colors or patterns, as examples. Individuals looking at the MV display 550 from viewing zone two will not be able to see the text, cues, or other content seen by the politician 530.

As an alternative, persons looking at the MV display from viewing zone two might see content that complements the speech. Perhaps they see a visual of a flag, or close-up video of the politician, or signing, captioning, or translations of the speech—as examples.

EXAMPLE 1B

Three Viewing Zones

Figure 6:
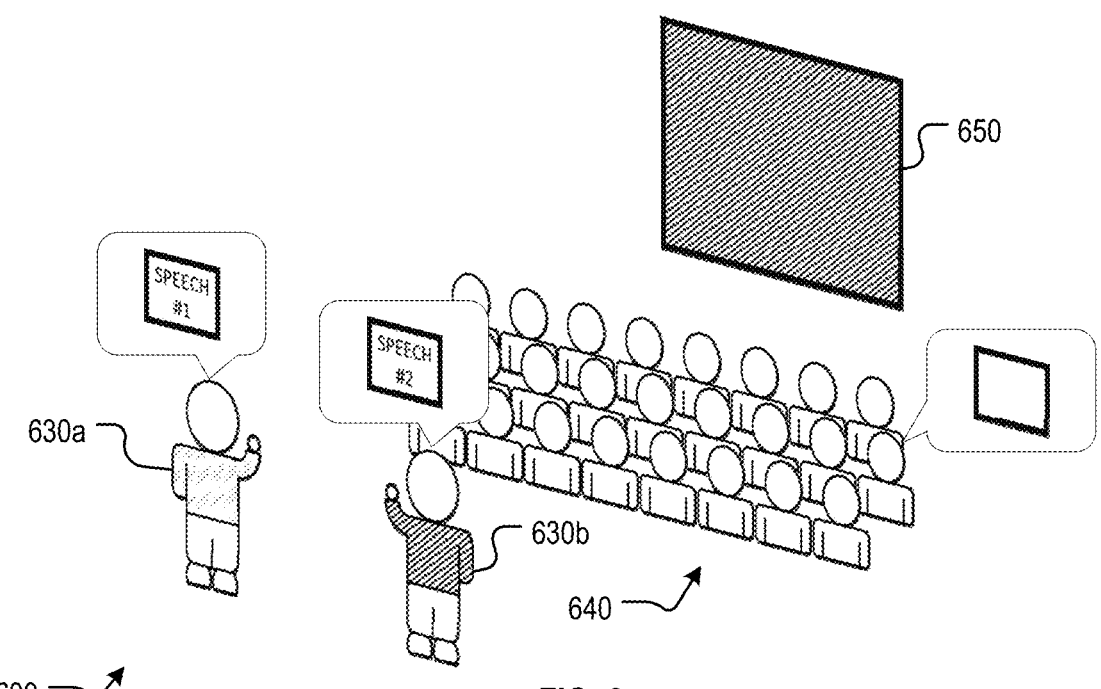

FIG. 6 illustrates an example 600 in which two primary users 630a-630b simultaneously see different content on the same MV display 650, while an audience 640 looking at the MV display 650 cannot see the content.

As a variation of the above example, a second politician 630b may be standing at the other end of a stage. In this case, a third viewing zone is created and is linked to content desired by the added politician 630b, e.g., his or her speech. The second politician 630b may be further from the MV display 650, in which case the content viewed from the second politician's position might be displayed using a larger font, or might otherwise be designed for enhanced visibility from a greater distance. Now, each politician 630a-630b will be able to see unique content that cannot be seen by the other politician, even though they are both looking at the same MV display 650 at the same time. The members of the press when looking at the same MV display 650 will not see any content at all, nor will any cameras directed at the same MV display 650 record images of the content being viewed by the politicians 630a-630b. Alternatively, the individuals 640 in other viewing zones may see, e.g., a countdown clock, publicity shots of the politicians, real-time coverage of the speeches, closed captioning, a sign language interpreter, or translations.

Figure 4:
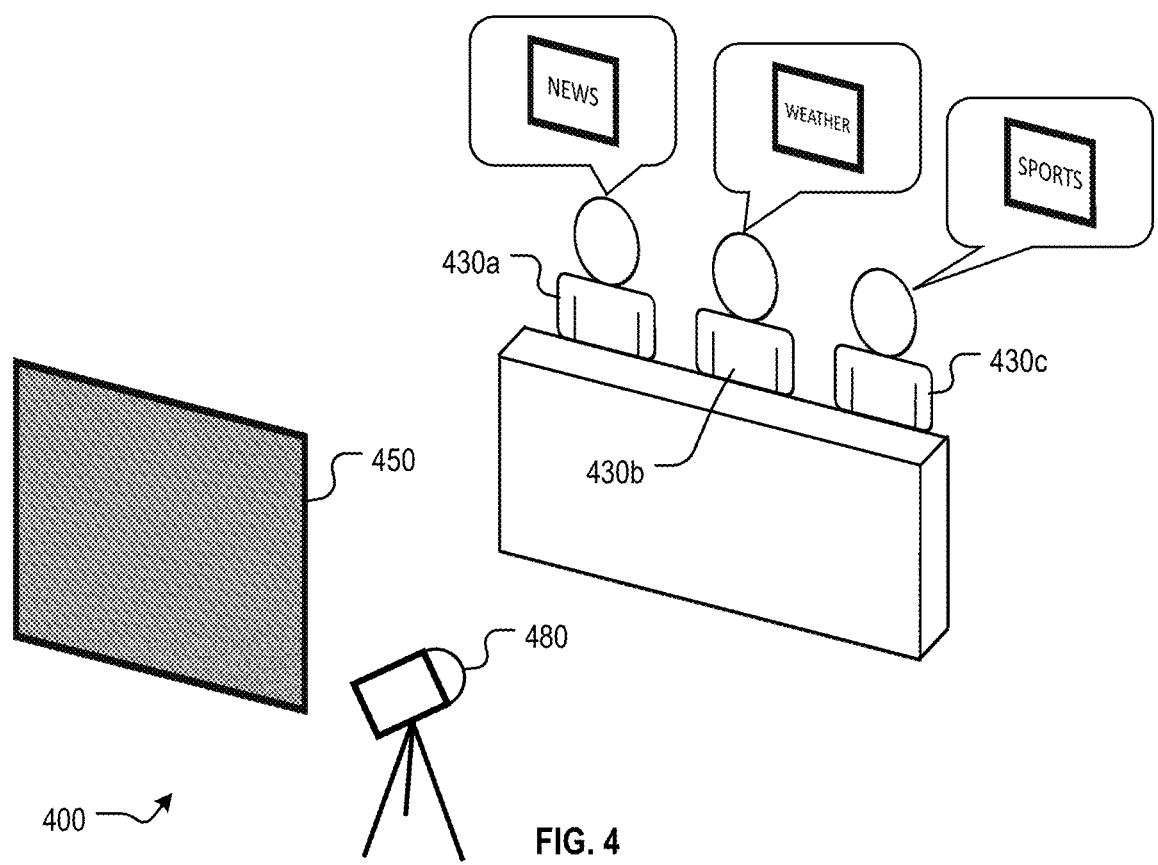

FIG. 4 illustrates a broadcasting example 400 in which three newscasters or announcers 430a-430c share the same MV display 450 while being recorded by a camera 480 for on-air broadcast. In this example 400, each newscaster 430a-430c may need to see different content at the same time as the other newscasters. One conventional way of handling this situation is to provide each newscaster with a dedicated laptop or tablet computer placed on or embedded beneath the surface of the table directly in front of that newscaster. A disadvantage of this approach is that the newscaster must look down to read the content and cannot maintain eye contact with the camera. In addition, placing laptop computers in view on top of the table can make the newsroom appear less organized or cluttered. Another possible approach would be to use a teleprompter to display the information for all three newscasters, but the combined presentation could be distracting or confusing. In example 400, the single MV display 450 is used to display content targeted to each newscaster 430a-430c, with each newscaster 430a-430c being able to see on the MV display 450 only the content relevant to his or her role (e.g., news, weather, sports, etc.).

Figure 18:
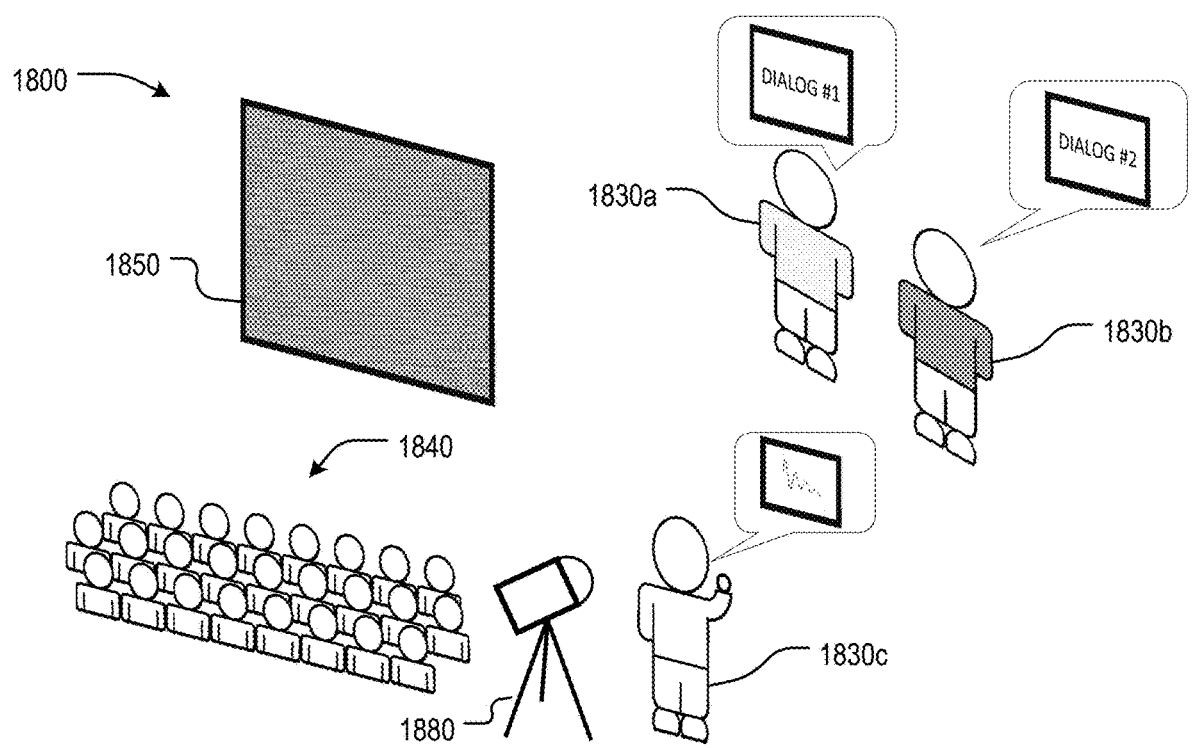

FIG. 18 illustrates an example 1800 in which two performers 1830a-1830b and a crew member 1830c share the same MV display 1850 while being recorded by a camera 1880. In this example 1800, each performer 1830a-1830b is able to view individualized cues (e.g., cues for action or dialog for speaking) on the MV display 1850 that would not be viewable by an audience 1840 or captured by a camera 1880, even if the MV display 1850 was in view of the camera 1880. Even though the crew member 1830c may not be visible to the audience 1840 or shown on camera, that crew member 1830c may also be able to view personalized instructional content on the same MV display 1850 used by the two performers 1830a-1830b. The audience 1840 may see nothing on the MV display 1850, or, alternatively, in an interactive performance, the MV display 1850 may be used to display instructional content to the audience 1840, such as, e.g., cues or lyrics that would allow the audience members to dance, clap, sing along, or otherwise interact with the performers 1830a-1830b on the stage. Distinct content might even be shown to different sections of the audience 1840 to allow for competitions or complex choreography or harmonies.

EXAMPLE 1C

Four Viewing Zones

Figure 7:
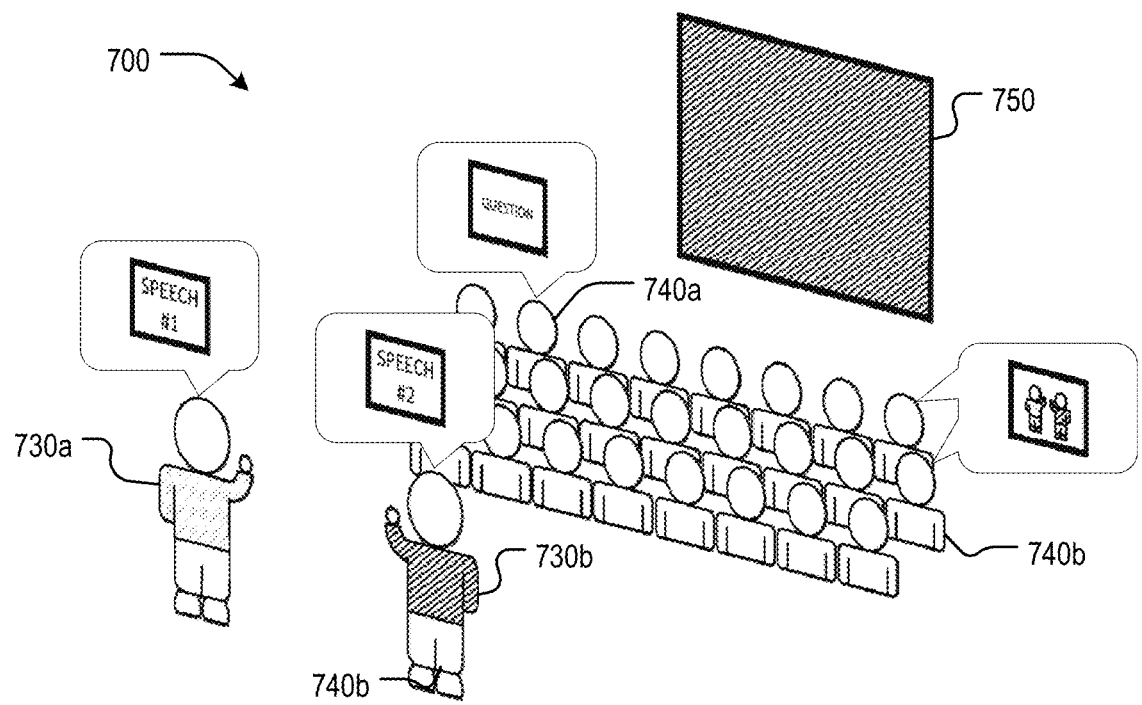

FIG. 7 illustrates an example 700 in which two primary users (e.g., politicians 730a-730b) simultaneously see different content on an MV display 750 while an audience looking at the MV display 750 cannot see the content. Concurrently, various members of the audience—continually changing among individuals—can see content targeted only to those members.

Continuing with the examples above, two politicians 730a-730b share the same MV display 750 to simultaneously read from their own scripts. Meanwhile, the audience 740b and members of the press see a live feed of the event—and not the scripts—when they look at the same MV display 750. Throughout the event, different audience members are invited to read questions they have submitted, but in a fashion that appears spontaneous. One after the other, designated audience members 740a see their question appear on the same MV display 750 everyone else can see, but only the one selected audience member 740a can see the question displayed on the viewing surface of the MV display 750, and only during the period of time that audience member 740a is allocated.

In this case, a number of techniques may be used to create a fourth viewing zone that is continually changing to align with individuals asking questions. For example, a moderator might reassign viewing zones by using a device linked to a camera on the MV display 750. When the audience member 740a stands, or raises a hand, the operator draws an area around that audience member's head on a user interface coupled to the camera and the system controller, and links that new single-person viewing zone to the content containing the question. Another approach may be to use sensors configured to detect the location of a microphone and to assign the fourth viewing zone to anyone holding the microphone as it is passed around.

In the examples provided above, various participants, including the politicians or performers, managers or directors, audience members, crew, etc., can simultaneously look at the same MV display and see content that supports their individual roles, functions, interests, and needs. Not only is the MV display serving as a cue or teleprompter for the politicians, it can provide targeted content to everyone else.

In addition, more than one MV display may be used. Each display may be assigned viewing zones and corresponding versions of content to allow users to move about more freely and appear more natural in appearing to address different areas of the audience.

EXAMPLE 2

Applications Using Large, Multiple, and Flexibly-Located MV Displays as Cues/Prompts Since MV Displays and similar technologies and systems can show targeted content that may only be seen by the intended recipient, these MV displays can be scaled to large sizes, used in greater quantities, and positioned wherever desired for optimal visibility and utility without overwhelming everyone in view of the MV displays with a barrage of images or other content. This approach creates the opportunity for new types of shows and applications.

EXAMPLE 2A

Cues/Prompts for Choreographing Performances

Figure 8:
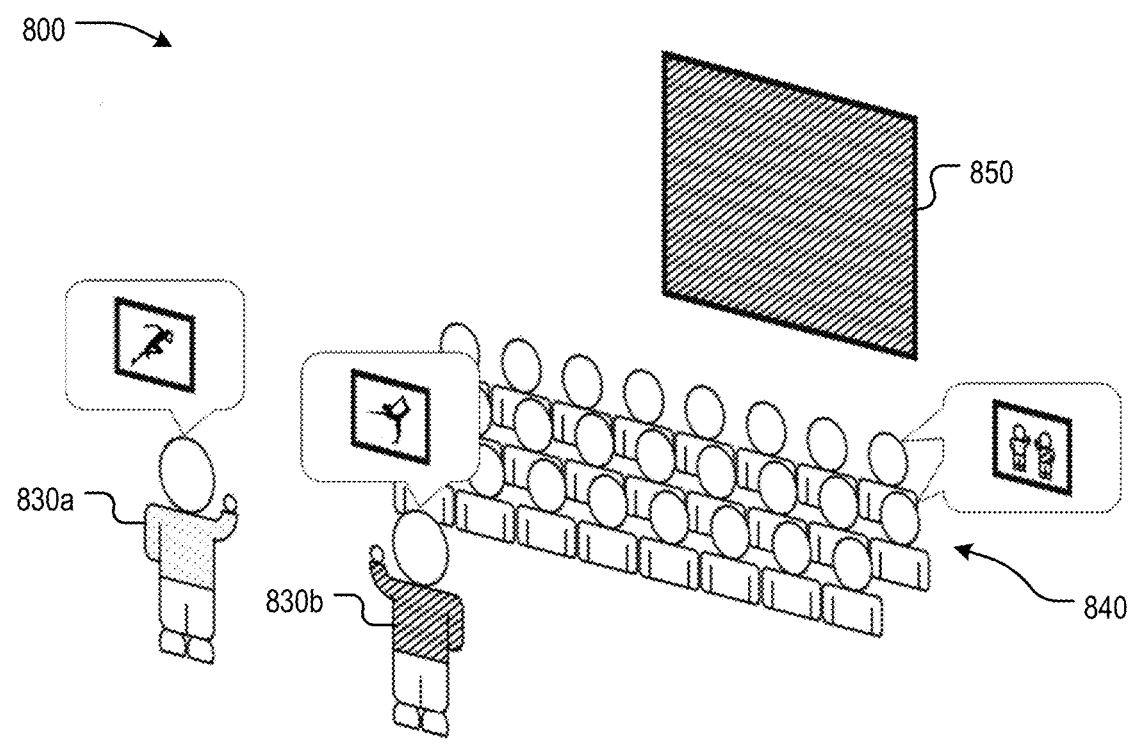

Current methods may not be effective for providing large-scale, proximate, or multi-display cues that are not visible to audiences or cameras but can easily be seen by performers. These requirements might be especially important to performers who are in motion, e.g., performers who are attempting to precisely mirror each other's movements, execute intricate choreography, or follow split-second timing. FIG. 8 illustrates an example 800 in which an extremely large MV display 850, perhaps capable of displaying images of people even larger than life-size, could be more easily followed by performers 830a-830b, while that content would remain invisible to audiences 840. Having the MV display 850 closer, or using more MV displays, could also be more effective in aiding performances where just using one or two cue devices discretely placed for concealment from audiences might not be effective. Since the content seen by the performers 830a-830b cannot be viewed by the audience members 840, even if they are looking directly at the MV display 850, there is much more flexibility in the number, location, and size of the MV displays. The cues on the MV displays may comprise simple or low-resolution graphics when using low-resolution MV displays, or may comprise actual filmed or computer-generated (CG) footage when using higher resolution displays. The image presented on the MV displays could be color coded or otherwise manipulated so individual performers could easily identify their counterparts or specific cues within a larger overall image. When appropriate, each performer could be assigned a specific version of content tailored to their needs. The MV displays and differentiated content could also assist in rehearsals, pre-visualizing, and refining a performance.

In cases where a performer or other user of the MV display is in motion, it may be necessary to track the performer's location and continually modify the performer's viewing zone. This may be accomplished using a sensor that follows the performer's movements (as described above with respect to sensing system 154), by pre-programming the performer's anticipated positions throughout the routine, by an individual making manual changes to the viewing zone by means of a user interface on computing device, or by some other means.

Figure 9:
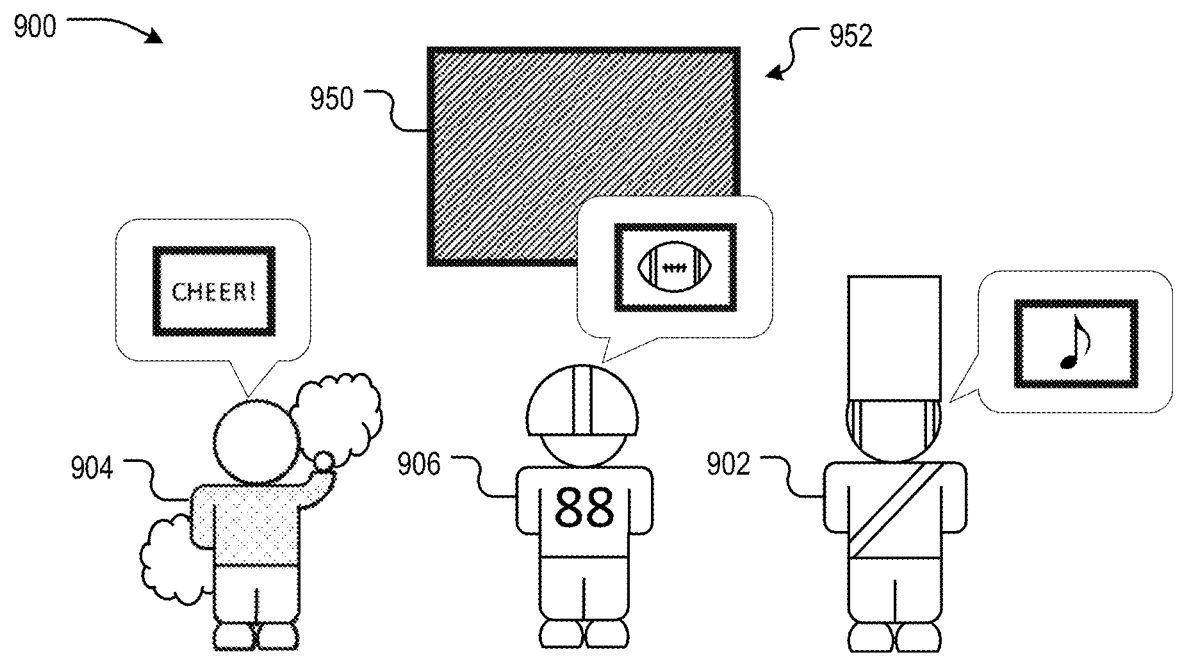
Figure 10:
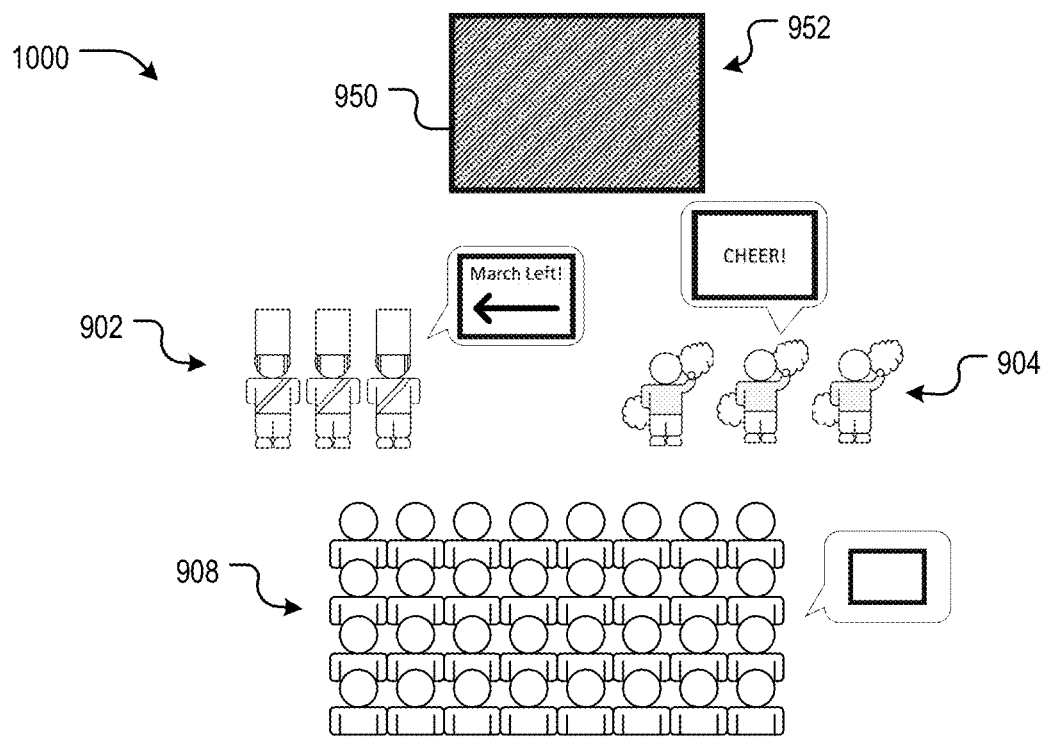

FIGS. 9-10 illustrate examples 900, 1000 in which an MV display 950 is incorporated into the scoreboard 952 in an athletic stadium. In this case, the marching band musicians 902, half-time performers, cheerleading squad 904, and athletes 906, might all look to the MV display 950 in the big scoreboard 952 for directions regarding positions, movements, maneuvers on the field, team practice, and choreography. For example, the lyrics to the Star Spangled Banner might be displayed to just the performer or to everyone in the stadium to assist in the performance of the National Anthem. Since the MV display 950 could show different versions of content to different sections of the field and the seats in the stadium, the cues and prompts on the scoreboard 952 would only be seen by those intended to receive those cues and prompts, and not by the other individuals in the stadium enjoying the seemingly well-rehearsed performances and game.

In stadiums and other crowd environments, a scoreboard or other form of MV display could be used to direct choreographed crowd performances, in which the audience becomes the show. For example, audience members 908 could be prompted to stand, sit, wave their arms, hold up a souvenir item, a colored card, shout, sing, or dance. By individually cueing audience members 908 or groups of audience members with targeted instructions, it is possible to have each person or group of people act as a pixel in creating large scale pictures, to perform complex versions of "the wave," or to engage in competitions between groups or sections.

Figure 11:
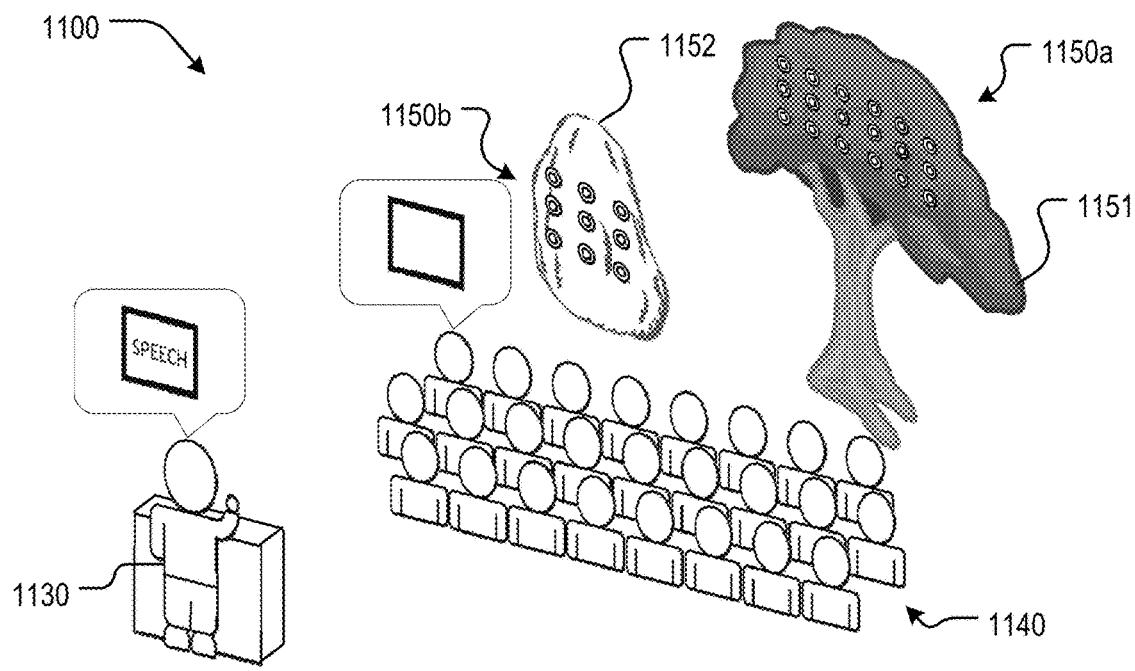

FIG. 11 illustrates an example 1100 in which the MV displays 1150 might be incorporated into the stage, architecture, landscaping, or other elements of the setting so as to be less conspicuous. As described above with respect to FIGS. 21-23, MV displays 1150 need not be rectangular and do not have to be of conventional shapes, sizes, or proportions, thereby making the MV displays capable of being more easily camouflaged. In the embodiment illustrated in FIG. 11, a first MV display 1150a is integrated into a tree 1151 and a second MV display 1150b is integrated in a rock 1152, where the viewing surface of the MV display 1150b appears to be merely the surface of the rock 1152. The MV displays 1150a-1150b could be integrated into the tree 1151 or rock 1152, respectively, using a variety of configurations. For example, in some embodiments, the planar viewing surface of the MV display 1150a may be provided inside of the branches of the tree 1151 such that the individual beamlets projected by that MV display 1150a are not obscured by those branches and can be seen by viewers in the desired viewing space. In other embodiments, the viewing surface of the MV displays 1150a-1150b need not be planar and could be curved to conform with any desired shape (e.g., to conform with the exterior surface of the tree 1151 or the rock 1152). In yet other embodiments, each of the multi-view pixels of the MV displays 1150a-1150b need not be affixed to a single rigid frame or structure. Instead, one or more of the multi-view pixels of the MV displays 1150a-1150b may not be rigidly attached to adjacent multi-view pixels, and could be individually positionable relative to adjacent multi-view pixels. For example, the multi-view pixels could be mounted onto a flexible sheet or net, similar to the flexible nets of LED lights that are conventionally used for Christmas lighting. This net of multi-view pixels forming the viewing surface of the MV display 1150 could then be draped over the tree, 1151, rock 1152, or other non-planar structure.

In yet other embodiments, the viewing surface need not be provided in the shape of a rectangular array. Instead, the MV display may comprise a linear arrangement of multi-view pixels, similar to the linear arrangement of a single line of Christmas lights. This linear arrangement could then be positioned along the length of one of the branches of the tree 1151 or even wrapped around the branch. Any arrangement and configuration may be used. Although rectangular arrays of multi-view pixels may be preferable if it is desired that the MV display project high-resolution images to the intended viewer, in other embodiments, such a high-resolution image need not be used. Instead, a single line of lights might collectively provide, e.g., a countdown to an event, signal a direction to walk or run, or prompt individual members of an orchestra.

EXAMPLE 2B

Cues/Prompts to Enable Mobility and Eye Contact for a Speaker or Performer

In another application, an individual giving a speech might wish to direct his or her eyes over the audience, and move freely over a wide area, giving the impression of engaging directly with the audience, owning the stage, and spontaneously speaking from the heart. In this case, a supersized MV display or series of displays might occupy areas around and among the audience, so the speaker's eyes can always land on a display, even while the speaker seems to be addressing each member of the audience by continually making eye contact and roaming the stage and audience area. The absence of a visible teleprompter or other device or notes enhances the illusion of spontaneity or preparedness. In this case, the viewing zone associated with the speaker's content is continually adjusted to reflect the speaker's location—using sensors, a tracking device on the user, manual inputs on an interface, predetermined and timed routing, an anticipatory algorithm, or other techniques. Alternatively, a range of viewing zones might be established, with the speaker always remaining within these zones.

A similar example would be a singer moving around or dancing on a stage who needs to see lyrics or other cues, while appearing to engage with the audience.

As before, the MV displays might be incorporated into the stage or surroundings so as to be camouflaged.

Figure 3:
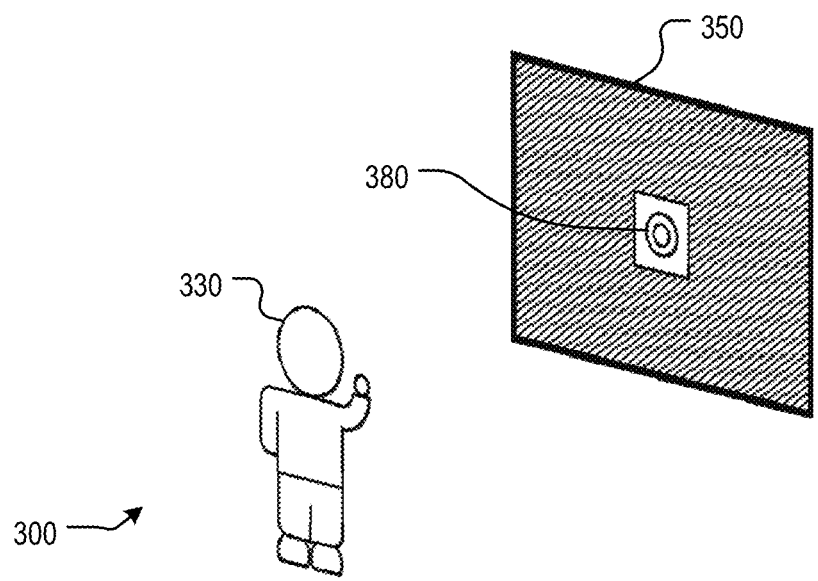
FIGS. 3-19 and 20A-20B illustrate examples utilizing MV displays in accordance with embodiments of the present invention.

FIG. 3 illustrates an example 300 in which the speaker 330 or performer is addressing a camera 380 and the MV display 350 is configured around the lens of the camera 380 or adjacent to it in a manner that may be difficult to achieve with a traditional display. Viewing zones can be designed so only the speaker 330 or performer sees the content on the MV display 350. A live audience attending the filming would believe the speech or performance was from memory, since they would not see anything on the MV display 350, and its purpose as a prompt would not be evident. Multiple people could use the MV display 350 simultaneously and each see only their own content, while an audience looking at the same MV display 350 at the same time would not be able to see anything or would see other content. Everyone within sight of the MV display 350 would be in a specific viewing zone assigned a version of content targeted for those individuals, or assigned no content at all.

The ability to blend MV displays into their surroundings, and conceal their content from everyone but the intended viewer, makes them well suited for use in, e.g., plays, live and recorded broadcasts and television, films, and podcasts. In these applications, it may be desirable for performers to appear to make eye contact with fellow performers, the audience, and the camera, and to move freely on a stage, or a set, or a location, while actually reading a script or receiving directions or other input. In these situations, MV displays can simultaneously serve multiple users—performers, directors, cameramen, stagehands, and others, without their content being visible to others.

In these applications, viewing zones may be static if performers are not moving around, or are moving within a limited area. Alternatively, the viewing zones may be continually adjusted to follow the performer around a stage, set, or location.

EXAMPLE 2C

Cues/Prompts for Musical Performances

Figure 12:
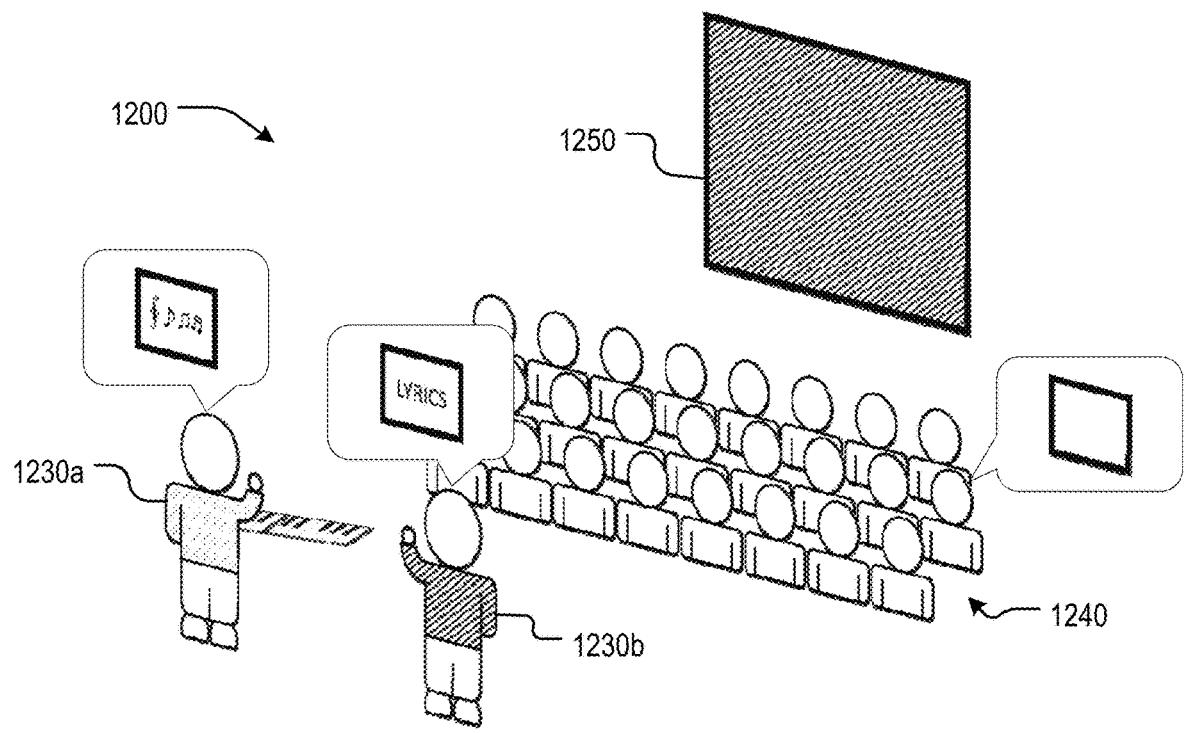

Bands, orchestras, ensembles, choirs, chorales, musical theater, and other forms of musical groups and performances may benefit from cues and prompts that simultaneously provide different content to sections and individuals, but cannot be seen by the audience or cameras, and are not a distraction on a stage or in a theater or other performance environments. FIG. 12 illustrates an example 1200 in which a first viewer (pianist 1230*a*) sees on the MV display 1250 the musical notation for that pianist 1230*a*'s performance, while a second viewer (singer 1230*b*) sees on the MV display 1250 the lyrics for that singer 1230*b* to sing. MV displays 1250 can be sized and situated for visibility to the performers 1230*a*-1230*b*, can simultaneously offer content specific to the requirements of each individual performer 1230*a*-1230*b*, and can conceal their content from viewing by audiences 1240 and cameras. These capabilities provide performers with benefits such as, e.g., the ability to: look up from their notes and better connect with audiences and cameras; not have to turn pages and search for their place on music sheets; receive real-time personalized notes, directions, and feedback; receive more comprehensive information in addition to their personal part—such as time, countdown to next part, and overall performance schedule; and other benefits.

If desired, viewing zones and content can be continually adjusted as performers 1230*a*-1230*b* move locations and performance criteria change.

EXAMPLE 3

Applications Using MV Displays as Cues/Prompts for Audience Interaction and Participation MV displays and similar technologies and methods can simultaneously show multiple versions of content, with each individual or group within sight of the MV display seeing specific content not visible to others. This makes it possible to construct cuing/prompting systems that allow for increased interactivity among and between performers (hosts, instructors, MCs, entertainers, etc.), who can each see content unique to their role and requirements; and their audiences, who can be provided cues/prompts and other content that allow them to be part of the show.

EXAMPLE 3A

Cues/Prompts for Interacting with Audiences

Figure 13:
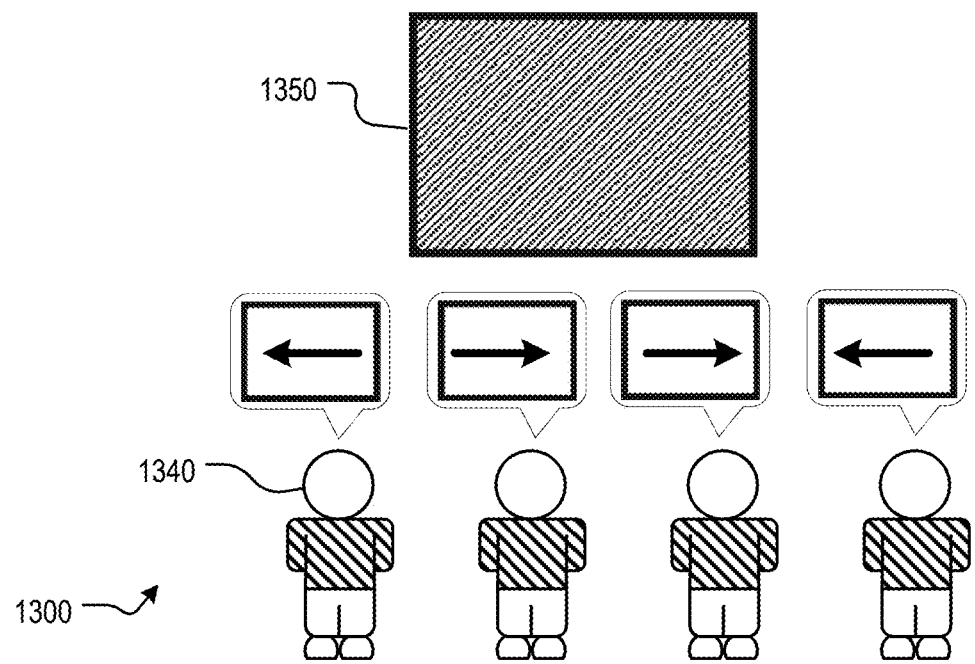

FIG. 13 illustrates an example 1300 in which an MV display 1350 is used for displaying cues and/or prompts for audience interaction and participation. In show environments—such as theaters, playhouses, or theme park attractions, for example—MV displays or similar technologies or methods might be incorporated into a performance, show, or experience that involves interactions between performers and the audience. Individual audience members 1340 might be provided lines of apparently spontaneous dialog that allow them to participate in a comedy routine, questions that might be part of a game show format, instructions for movement, challenges, puzzles, or other content that invites participation and interaction. For example, a host or teacher might view content to guide the host or teacher in speaking to the audience, while the audience members looking at the same display sees personalized content, such as a question, claim, maze, puzzle, or picture and in response can shout out answers or solutions, or compete with other audience members in performing a dance or other action. Alternatively, audience members 1340 might see lyrics for a sing-along, with different people perhaps receiving different parts. Meanwhile, the performers might receive a cue on the MV display that contains audience members' names or other information to imply a personal connection. Alternatively, a spotter might identify to the on-stage host, by way of the MV display, which audience members seem best suited for participation in the show.

Figure 15:
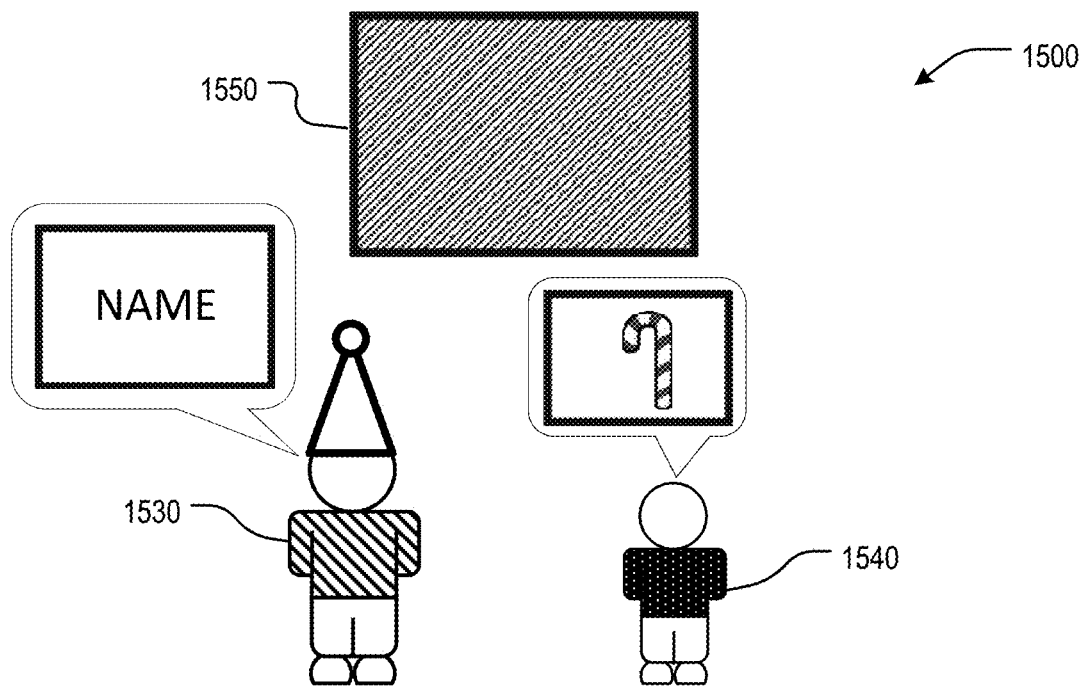

In situations where it is desired to create the illusion that a performer knows the name and other particulars about audience members, names might be collected before the show and then associated with certain seats or locations. FIG. 15 illustrates an example 1500 in which a Santa Claus performer 1530 could see on an MV display 1550 the name of a child 1540 in seat 23B. Others looking at the same MV display 1550 at the same time would see different content or a blank screen, so Santa's knowledge would seem magical. Personalized audience information, e.g., a child's name, age, grade, desired Christmas present, etc., might also be inputted by audience members on their cell phone or other personal device for use by the host, as examples.

Multi-view technology might be combined with traditional media technologies or with sets, interior furnishings, or architecture. In this manner, MV displays can be better concealed from those who do not need to see them and better positioned for optimal viewing for those who are using them. So, cues and prompts intended for the Santa performer 1530 might be incorporated into a large array of MV displays 1550 purporting to show conditions at the North Pole, or into an MV display disguised as block of ice, an MV display decorated like a gift wrapped package, an MV display formed into the body of a snowman, an MV display incorporated into a screen with animated snowfall, or an MV display incorporated into a snow globe, as specific examples for this sample "Santa" theme.

An additional use for this and other applications provided in this disclosure is providing language and hearing impaired assistance to the primary user, staff, audiences, and others. For instance, the MV display can show subtitles to the hearing-impaired, or language translations to foreign speakers, so all parties can better understand each other. The MV display may be used to display phonetic cues to the host so that the host can attempt to speak words or phrases in the audience's language with the help of those cues. The cues may be inputted by an off-stage translator, a voice-activated automated translator, or some other means. Alternatively, a host can have the guest's words translated or made plainer or more accessible, so as to be more responsive. Since the guest will not be able to see the content provided to the host/primary user, it will appear impressive that the user seems able to understand the audience—despite language or hearing issues or disparities.

In the Santa example 1500, a Spanish-speaking child 1540 may be speaking with an English-speaking Santa performer 1530. An MV display 1550 can provide the Santa performer 1530 with translations of what the child 1540 is saying, as well as appropriate responses, without the child or child's guardians being able to see the translations on the MV display 1550. The Santa performer 1530 will seem to be the universal/international personality of legend and stories. This can be implemented with a live or computer-generated translator monitoring the interaction and inputting the content for display on the MV display 1550, or through some other method. The translation will then be assigned to the viewing zone occupied by the Santa performer 1530, so he will be the only one who can see it.

Continuing with the Santa example 1500, a hearing impaired Santa performer 1530 might see on the MV display 1550 a transcription of what the child 1540 is saying, so as to provide appropriate replies. Alternatively, a hearing impaired child 1540 might see the transcriptions, so as to understand the Santa performer 1530. The captioning would be assigned to the viewing zone occupied by the Santa performer 1530, the child 1540, or both, as desired.

EXAMPLE 3B

Cues/Prompts for Competition and Gaming

In gaming applications, participants might view puzzles, mazes, questions, quizzes, or other challenges on MV displays that present multiple versions of the game to individuals, teams, or groups—each of which simultaneously view only their own version. Each player's individual or team progression, status, or score might also be revealed on the MV display, exclusively for that player's own viewing. Moderators might see their own scripts or prompts on the MV display to aid in interacting with participants. All versions of content are simultaneously available, but can only be seen by their intended viewers. Participants might engage in the experience through vocalizations, motions, bio-feedback, game devices, personal devices, built-in interfaces, sensors, or other means. MV displays might be combined with regular screens and displays. With this hybrid approach, participants can be immersed in more media, while still benefitting from the interactivity, personalization, and other dynamics of MV displays.

MV displays also facilitate the incorporation of online, off-site, and multi-site participants, as well as computer-generated and puppeted elements, into a group gaming activity.

In some embodiments, a multi-view display may be used to provide an interactive experience for audience members. For example, it may be desirable to display targeted content to one or more audience members watching a show or presentation. This content may comprise, e.g., a question for the one or more audience members, a challenge for the one or more audience members, or a puzzle to be solved by the one or more audience members. The audience member(s) may then respond to the question, challenge, or puzzle by providing a response using, e.g., an electronic device, such as a mobile phone, tablet computer, joystick, keyboard, or game controller, an unpowered device, such as a flag or paddle, or without the use of any other devices, such as by waving a hand, standing up, speaking, or other bodily function. The audience member(s) response(s) can then be detected using a camera, controller interface, or other sensor, and the interactive experience may incorporate the response(s) into the interactive experience. Different audience members or groups of audience members in a second viewing zone may receive different interactive content. The responses can be part of a competition between the two or more audience members or groups of audience members.

EXAMPLE 3C

Cues/Prompts for Education and Learning

Figure 14:
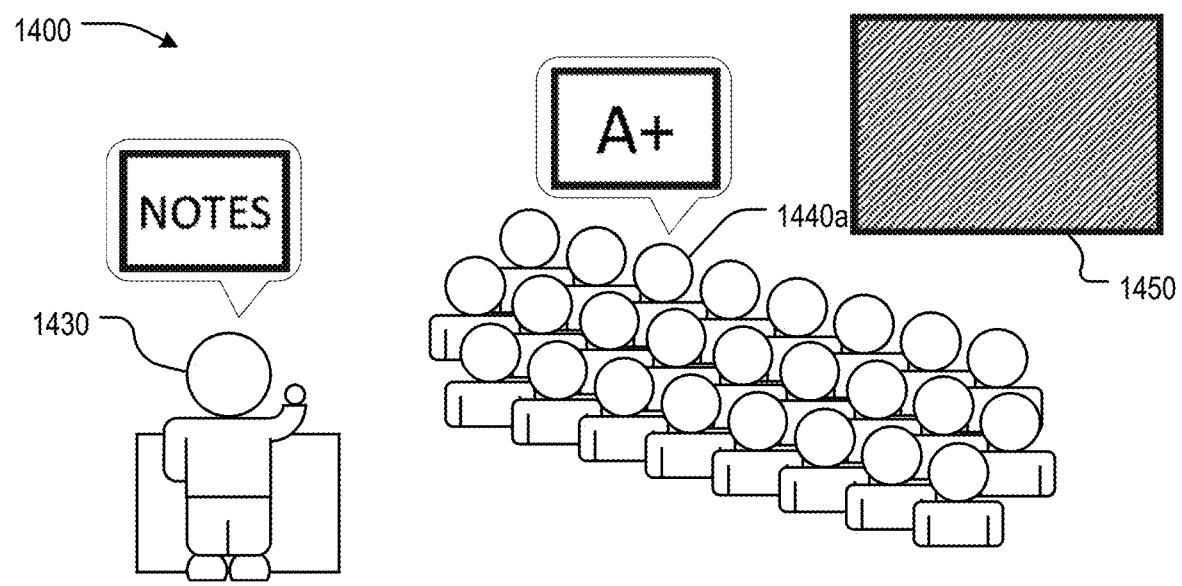

FIG. 14 illustrates an example 1400 in which an MV display 1450 is used in an educational application. MV displays—and technologies and methods with similar attributes - can be an effective tool in educational environments, allowing instructors and students, individually or in groups, to simultaneously see different versions of content on the same display. The learning experience offered by these systems might consist of challenges, competitions, tests, or group problem solving, as examples. Specific scores and other feedback might be shown on displays that are differentiated for each student or team member. The instructor 1430 might separately view on the MV display 1450 lecture notes, problems, solutions to tests or challenges, or individual student names, backgrounds, or scores, that are not visible on the MV display 1550 to the students 1440. Instructors 1430 might better interact with and track the performance of individual students 1440, even with very large audiences. Students might input or provide responses to questions or challenges through vocalizations, body motions or signals, bio-feedback, game devices, personal devices, built-in interfaces, sensors, or other means. MV displays might be combined with regular screens and displays that show non-differentiated content. With this hybrid approach, more comprehensive and immersive media can be used while still retaining interactivity, personalization, and other benefits achieved with MV displays.

The system might recognize individual students 1440 through assigned seating, facial recognition, a check-in process, cell phone call-in, identification cards, bio-feedback, or other means.

Each student 1440a might be able to view on the MV display 1450 his or her personal test grades, participation results, or individualized assignments in the form of differentiated content that only he or she can see.A10

MV display educational environments can serve as a counterpoint to online classes, laptop inputting, and oversized classes, by providing instructor/student personalization, group participation, collaborative problem solving, immersive content, socialization, eye contact, and other dynamics lost when students are staring at a laptop or personal device.

MV displays can also facilitate the incorporation of online, off-site, and multi-site participants, as well as computer-generated and puppeted elements, into group learning activities.

In addition, MV displays can provide language and hearing impaired assistance to the primary user, staff, audience, and others.

EXAMPLE 4

Applications using MV Displays as Cues/Prompts for Personalized Encounters

MV displays—and technologies and methods with similar attributes—can allow for personal interactions in which an entertainer, performer, costumed character, instructor, salesman, host, or other person can appear to possess knowledge, wit, insights, and perceptions that in fact they are reading off the MV display. This can be achieved by creating a viewing zone occupied only by the user, and then linking this zone to the version of content containing the script or information needed by the user.

EXAMPLE 4A

Cues/Prompts for Meet-And-Greets and Other Interactions

There are situations in one-on-one or group encounters in which the individual leading an activity or doing most of the talking could benefit from receiving targeted information about the audience. For example, a costumed or fantasy character might be expected to know a child's name. Fictional or role-playing characters, e.g., Santa Claus, a fairy tale princess, an animated movie character, Elvis, or a mascot, would create a more effective interaction by knowing certain personal information about audience members, as well as being able to access scripts and information pertinent to their character and role.

A traditional teleprompter, notes, or other means of providing prompts and cues might not be practical because of the close proximity of participants. MV displays offer the ability to provide content that can only be seen by the intended viewer, even when in plain view of the child. As a result, while the Santa performer might view a child's name and wish list on the MV display, a child looking at the same display might see an "elf cam" video of elves hard at work in their shop, and the child's guardians might see on the same MV display proofs of the photos of Santa and their child taken during the meet-and-greet.

In these cases, there are many ways the desired information could be gathered and provided to the viewer. In the Santa Claus example, a child's guardians might submit relevant data on a personal device during the encounter, or in advance on a computer, at a kiosk, or in an interview with an assistant elf, as examples. The information could then be entered as content only available to Santa from his specific viewing zone. The content could then be queued and directed in real-time onto Santa's MV display by an assistant or by Santa himself as each child approaches. Other viewing zones might be established for the child, the child's guardians, the next family in line, and others in sightline of the MV display. For each viewing zone, appropriate versions of content would be provided. All versions could be simultaneously available for viewing on the same display, but each specific version could only be seen within its designated viewing zone.

Since participants might be moving about, an assistant using a laptop, pad, or personal device, for example, could make real-time changes to the viewing zones to ensure the right people see the right content. Alternatively, viewing zones could be adjusted automatically through the use of sensors or other means that track the location of individuals and make a corresponding change to their viewing zone.

In other cases, performers or characters might engage in storytelling, playing games, taking photos or video, magic acts, or other activities in which they view scripts, prompts, cues, previews of photos or video, or other content on an MV display.

Magic, mind-reading, and supernatural performances, in particular, would benefit from the ability to provide content to the performer that could not be viewed by the audience. Spotters, sensors, hidden microphones, and other sources of input could be used to make the performer appear to have inexplicable insights and access to secret knowledge and private information. As before, the secret content would be included in a version of content that could only be seen from the viewing zone occupied by the performer. The performer's viewing zone could be static, or could be continually changed as he or she moved about. The audience, and even volunteers called up to the stage, would be assigned viewing zones linked to other content that wouldn't give away the performer's source of information.

There may be situations, as another example, where a character, role-player, or other performer needs to be directed real-time. Maybe they are serving as a living surrogate, avatar, or puppet for someone off-stage. Perhaps the performer is wearing a costume with mechanical elements that are controlled on-board or remotely or audio that is provided through on-board recordings or remotely. In these and related cases, the performer might use an MV display to view how the costume and effects appear to the audience, along with graphic or written directions on how to conduct the physical part of the performance, as well as a script on what to say or what audio is going to be provided. The offstage assistant, director, or controller might be remotely monitoring the performance and inputting real-time responses to audience questions, behaviors, appearance, language preference, and interactions. So, a Lincoln look-alike could answer extremely detailed questions about the President's life, seemingly from memory, but actually inputted to an MV display by a remote operator, a voice-prompted or action-prompted query system, or some other method. The input on the MV display would only be visible to the surrogate Lincoln—in this example—who would be standing in the viewing zone assigned to the content he needed for his performance.

There may be a wide variety of cases in which various movements, audio, and other characteristics and outputs of a performance are provided remotely, automatically, or through some onboard mechanism in a performer's costume, as examples. In some situations, the performer may have reduced visibility from a costume, or require a wider perspective of the audience or performance area. Safety may be a consideration, as well as show quality and other factors. In these cases, an MV display can serve to provide images and other content that may allow a performer better visibility, needed perspectives, operating instructions, feedback, directions, scripts, or other content.

An example might be a performer in a robot costume. The robot might have extra arms, a mechanical mouth, mechanical eyes, and articulated antennae—some or all controlled by a remote operator, by pre-programming, by an interface inside the costume, or some combination of these. Perhaps the operator provides the voice, or maybe it is delivered by a remote voice actor. There may be sound effects provided remotely or through an in-costume interface and recordings. All these and more might be better implemented with the aid of an MV display that allows the performer inside the costume, and/or assistants to the performer, to view content about the current state of the performance that cannot be viewed by the audience or cameras.

In some of these cases, the performer might have only a very narrow field of view, but by focusing it on an MV display, he or she could be allowed by way of the MV display a wide-angle view of the performance area, or a dashboard of necessary information, or other prompts, cues, or content.

MV displays can provide language and hearing impaired assistance, so interactions can take place between participants from different places, and with different language and communication knowledge and capabilities. Since language and hearing-impaired text can be provided to the person needing it, while different content can be provided to the other participants, the exchange can seem more magical, authentic, and spontaneous. Each participant receives content that is enabling to his or her needs.

As in earlier examples, the performer's content would be assigned only to his or her viewing zone and would not be visible to audiences looking at the same MV display. The performer's viewing zone could be static, or continually readjusted, depending on the desired effect. Others looking at the same MV display at the same time might just see a blank screen, or they might see some neutral color or pattern that blends the screen into its surroundings or camouflages its function. Alternatively, they might see some different or complementary content that enhances the overall experience.

EXAMPLE 4B

Cues/Prompts for Sales Presentations

Figure 16:
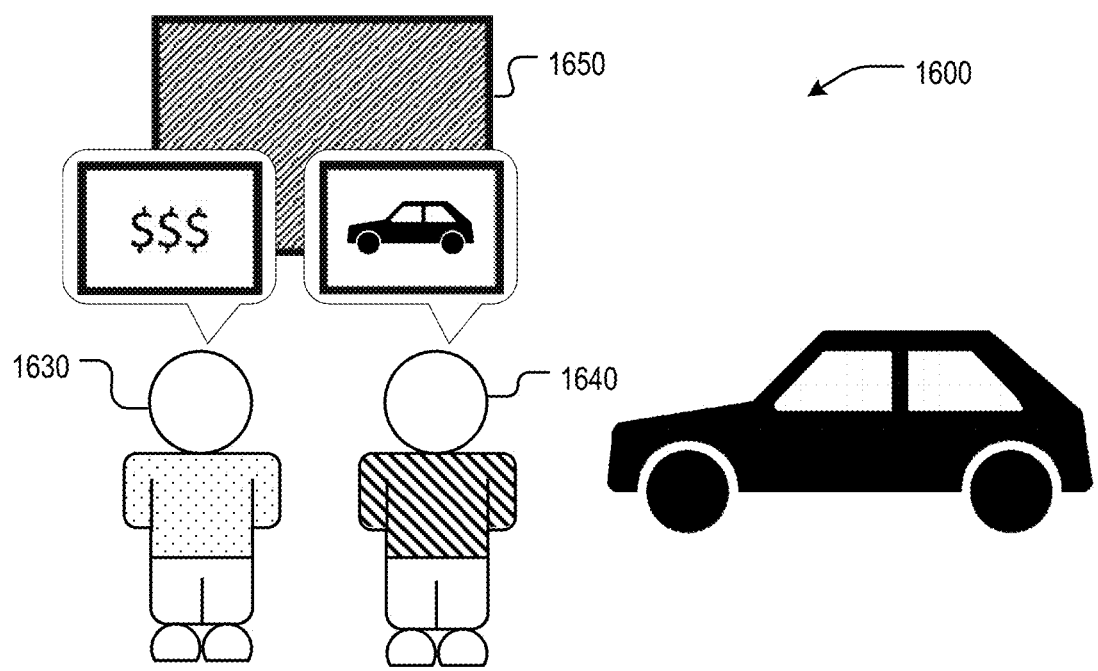

FIG. 16 illustrates an example 1600 in which an MV display 1650 is used to provide instructional content relating to an interaction between viewers, e.g., in a sales application. There are situations in which a first viewer (e.g., a salesperson, broker, agent, hotel front desk clerks, or other professional) might wish to read a sales pitch or spiel, facts, details, or other information relevant to the interaction between that first viewer and a second viewer, off of a display, while appearing to spontaneously deliver this information from experience and personal passion. In these cases, they can refer to MV displays 1650 that reveal to them the desired content, while customers 1640 looking at the same MV display 1650 display see nothing or different content altogether. The interaction information viewed by the first viewer could relate, for example to one or more of: a transaction between the first viewer and the second viewer; information gathering by the first viewer from the second viewer; the exchange of sensitive information by the first viewer to a second viewer; a sales transaction between the first viewer and the second viewer; or a check-in process between a staff member and a guest, such as, e.g., between a hotel front desk clerk and a guest, between a host and a customer, or between an amusement park attraction attendant and a rider.

MV displays can serve as computer displays, allowing a user to access information off the internet, for example, while those nearby see some other content, e.g., a glossy picture of the new car they wish to buy. This may be useful if a salesman 1630, for instance, wants to look at confidential price sheets, inventory lists, sales pitches, specifications, or other data or content, without overtly concealing it from a potential customer 1640.

MV displays can be used to provide assistance for non-native speakers or the hearing impaired by facilitating interactions, with each participant receiving content that is enabling to his or her specific needs. Each user would see his or her own targeted content directed to his or her own viewing zone. Assistance in inputting translations or captioning could be provided by off-site personnel, translation or speech recognition tools, or by other means.

As before, the primary user would look at the MV display from a viewing zone linked to the desired content, while adjacent viewing zones would be assigned content suited for audiences, customers, clients, passersby, and others.

EXAMPLE 4C

Cues/Prompts for Experts/Professionals giving Advice, Tests, and Instructions

Figure 17:
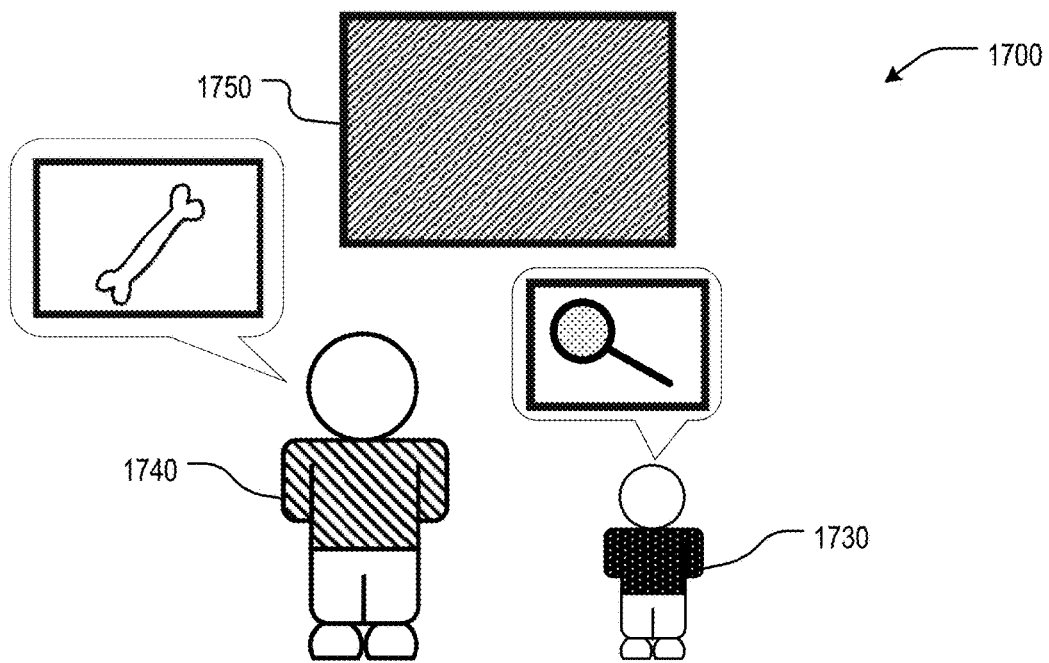

FIG. 17 illustrates an example 1700 in which an MV display 1750 is used in a medical or other professional environment. Many experts may wish to access information they do not want to share with clients or audiences who may be right next to them. Using an MV display 1750, the professional 1730 can view the Internet, databases, remote feeds, or other sources of content, without customers or clients 1740 being able to see the content, even though looking at the same display at the same time.

There may be other reasons in these situations for showing different content to different individuals sharing the same display. The MV displays could show the same content tailored for different ages, genders, cultures, languages, levels of understanding, or levels of anxiety, for instance.

An example might be a physician 1730, who wants to compare a patient's symptoms against a checklist, database, or image file. The physician 1730 may not want to distress the patient 1740 with medical photos or descriptions, but may wish to study them in the patient's presence. Alternatively, the doctor 1730 may be viewing on the MV display 1750 images being taken with a probe that may not be suitable for a squeamish patient. By using an MV display 1750 and having the viewing zone associated with potentially distressing medical content linked to the location of the doctor 1730, a patient 1740 looking at the same display can be shown more benign content linked to that patient's viewing zone location.

In another application, a physician 1730 may want to perform tests, or ask questions, with the patient 1740 nearby. Allowing the physician 1730 and patient 1740 to see different content while looking at the same MV display 1750 permits the physician 1730 to view detailed information and decision tree flow charts, as the patient 1740 views simple questions or sanitized, benign images, for example.

As in previous cases, MV displays can simultaneously show content in different languages, or with captions for the hearing impaired, to facilitate communication. Content can be directed to a specific individual or group, with each individual or group seeing content targeted to their needs. Voice and translation software or services, or other means, can be used to input into the MV display the appropriate content.

Auto mechanics, technicians, school teachers, contractors, and architects, are a very small sample of those who might wish to collect input from a client in the client's presence, without the client being able to see the prompts, analysis, results, or other content on an MV display within the client's view.

EXAMPLE 5

Applications using MV Displays as Cues, Prompts, and Previews for Photo Ops, Photo Taking, Filming, and other Media Production The use of MV displays and similar technologies and methods in conjunction with media production, image capture, filming, photography, and videotaping, as examples, has numerous applications, for instance in studios, sets, sound stages, on location, in theme parks, on cruise ships, at resorts, travel destinations, events, weddings, and many other places and situations.

Allowing multiple people the ability to look at the same MV display at the same time and see different content, means the MV display can simultaneously be used for cueing and prompts, providing directions to talent and crew, translating text into different languages, providing captioning for the hearing impaired, monitoring of the content being recorded, entertaining talent and bystanders, reviewing content, displaying content for possible purchase or use, and other purposes. These functions are enhanced in many cases by the ability to prevent some persons from viewing content easily seen by other persons when looking at the same display.

EXAMPLE 5A

Cues/Prompts for Photo Taking and Filming

Figure 19:
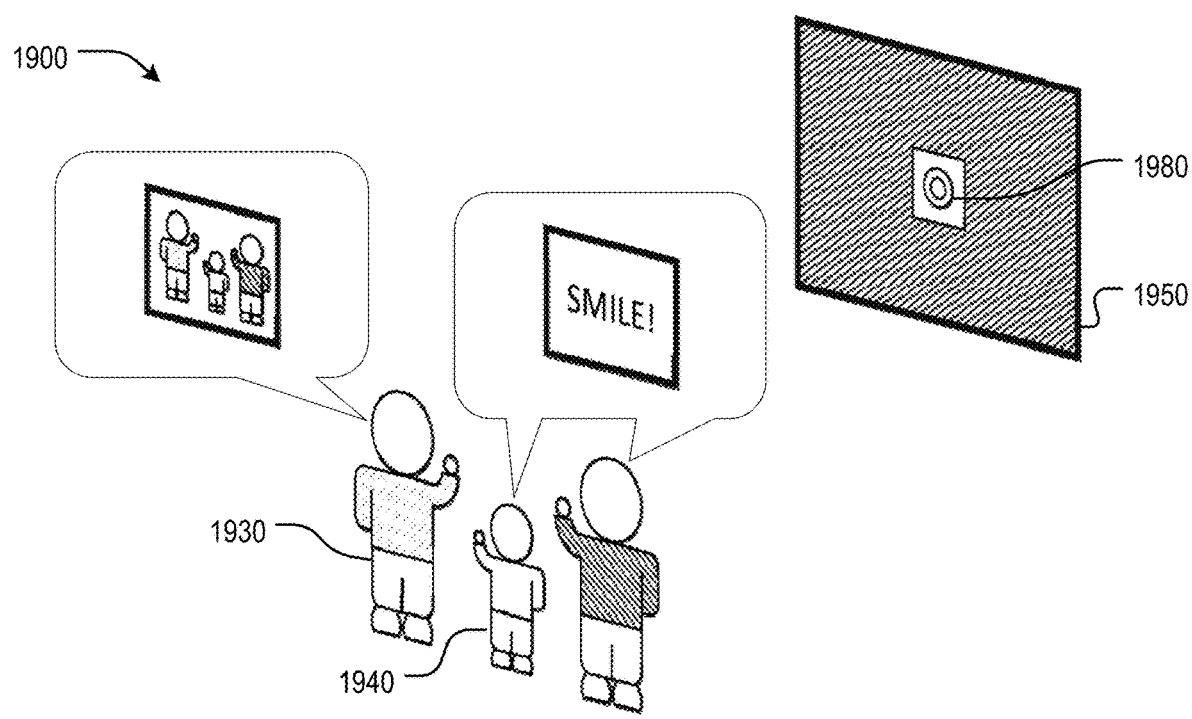

FIG. 19 illustrates an example 1900 of the use of an MV display 1950 for photography applications. In recording photos, video, and other media, an MV display 1950 can serve as a preview to camera operators, assistants, and others, so they can properly compose the scene without distracting the subjects 1940. For example, if a preview of the photograph is displayed on a conventional computer display, the child subject might tend to look toward the preview to see himself or herself, instead of looking toward the camera or wherever else they should be directing their eyes in order to obtain the best results. As another example, the crew might see on the MV display a countdown clock or other visual cue that supports their roles, but could produce anxiety if viewed by the subject, who would instead be shown a non-distracting subject on the same display.

In the case of a Santa Claus photo opportunity, by allowing only Santa to see the preview image of a photo being taken of himself and a child, Santa can control the process and compose himself and the child, without distracting the child, who might otherwise be staring at the MV display. Santa and the child would each be occupying a separate viewing zone, with each zone assigned a separate version of content. The viewing zones might be altered dynamically to correspond with the shifting positions of Santa and the child, e.g., by an assistant using a personal device, by object tracking, or by other means. The viewing zone for Santa would be tied with content consisting of the scene captured by the camera 1980. The viewing zone for the child 1940 could show non-distracting content or no content at all. Alternatively, if the MV display 1950 was positioned close to the camera lens, the MV display 1950 could have fun, entertaining, or inspiring content to make the child 1940 smile or express a desired emotion while seeming to look at the camera 1980.

One method of obtaining quality photos, video, and other media would be to incorporate the camera lens into an MV display. This would help camouflage the camera and allow the opportunity to surround the lens with humorous or other mood or reaction-inspiring content. The subject would appear to be looking at the camera and would be captured reacting naturally to the media content, instead of reacting self-consciously to the camera.

In the Santa example, the camera lens might be incorporated into an elf's eye on the MV display. As a result, the child viewing the MV display would think he or she was looking at a funny cartoon character instead of a camera lens.

In general, using an MV display as a preview/monitor for capturing photos, video, or film at any scale, from big-budget films to small-scale photo opportunities, allows specific persons the ability to preview the subjects and scene, while others within sight of the same display are not distracted by seeing themselves or their fellow subjects. Everyone sees content targeted to their needs.

In these cases, viewing zones are established for the areas occupied by those who wish to use the MV display as a preview. Anyone in these viewing zones looking at the MV display will see the subject of the camera lens. Anyone looking at the MV display from outside these viewing zones will see some other form of content or no content at all. The viewing zones can be very specific, so that only some of subjects, such as parents or the on-camera director, can see the preview and help compose the scene, while the remaining subjects occupy viewing zones that see other non-distracting content.

EXAMPLE 5B

Multi-View Displays for Media Capture and Sales

There are many situations in which people are photographed or videotaped, and the media is then offered to them for sale. In these cases, the subjects and purchasers may wish to preview the media as it is being taken and then review it to make a purchase decision. For discussion, these systems are referred to below as "image capture," and may include photos, video, and other media, as examples and not to be inclusive. The use of MV displays for image capture may be used in conjunction with the other cueing/prompting applications described earlier, with other applications, or as a stand-alone.

There are many scenarios in which an image capture system might allow the subjects to compose themselves with the aid of an MV display. One or more of the subjects, or an off-camera assistant, could preview the scene on the MV display, help pose and otherwise direct the subjects, perhaps establish the timing and other criteria, and then create the media using the image capture system. The MV display would show the preview only to those individuals who need to see it to help get the desired shot. Other subjects would see nothing on the MV display, allowing them to focus their attention on the camera lens, on each other, or on another subject in the photo or video.

With some systems, there might be a blue or green screen effect or some other special effect. In these cases, different members of the party might look at the MV display and see the setting with or without the final effect, or they might see nothing at all or different content altogether. The MV display may be positioned near or surrounding the camera lens and show content to some of the subjects that elicits smiles or other desired expressions. In this manner, better images and video might be obtained, and more surprising and spontaneous results achieved.

To determine which subjects see which versions of content on the MV display, a number of viewing zones may be established, with each viewing zone assigned to a version of content. As one option, for instance, the zones could be established in vertical space, so with an adult standing over a child, each could be assigned a separate viewing zone, and each would see a different version of content. One or more persons in the photo can then direct everyone's placement and poses to achieve the desired image, video, or other media. The person or persons acting as director can be in the scene or off-camera.

Viewing zones might be predetermined or set by the subjects using their personal device, a device provided with the system, or established by staff, or through some other means. They might automatically change depending on the shifting location of each of the subjects using sensors or other tracking techniques. Perhaps one or more of the subjects are designated as "image capture directors" by a sticker, RFID tag, or something else, so whenever they approach an image capture, they are automatically allowed to see the preview content on the MV display.

Figure 20A:
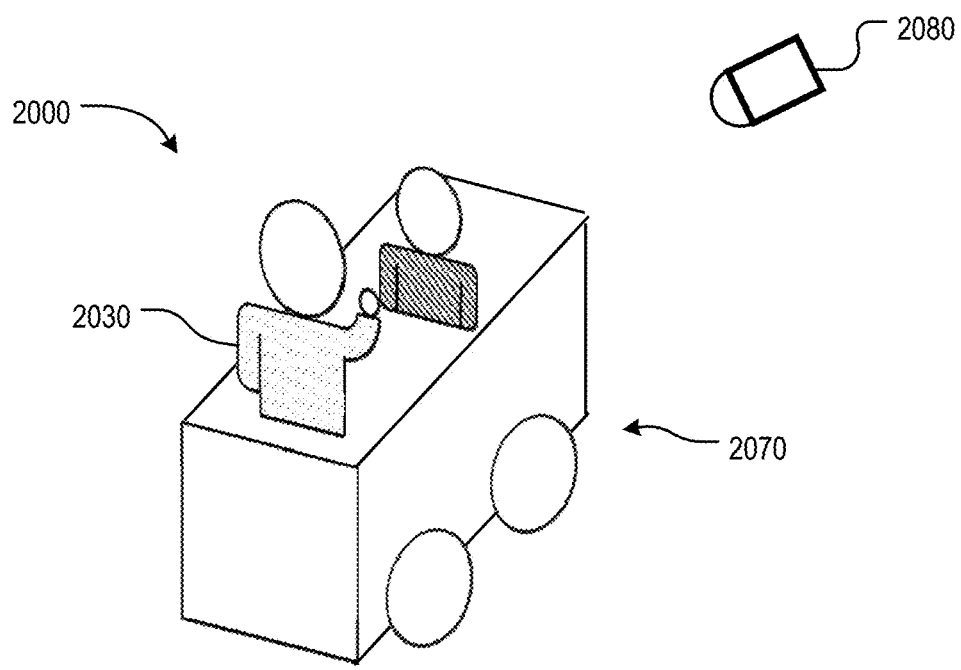
Figure 20B:
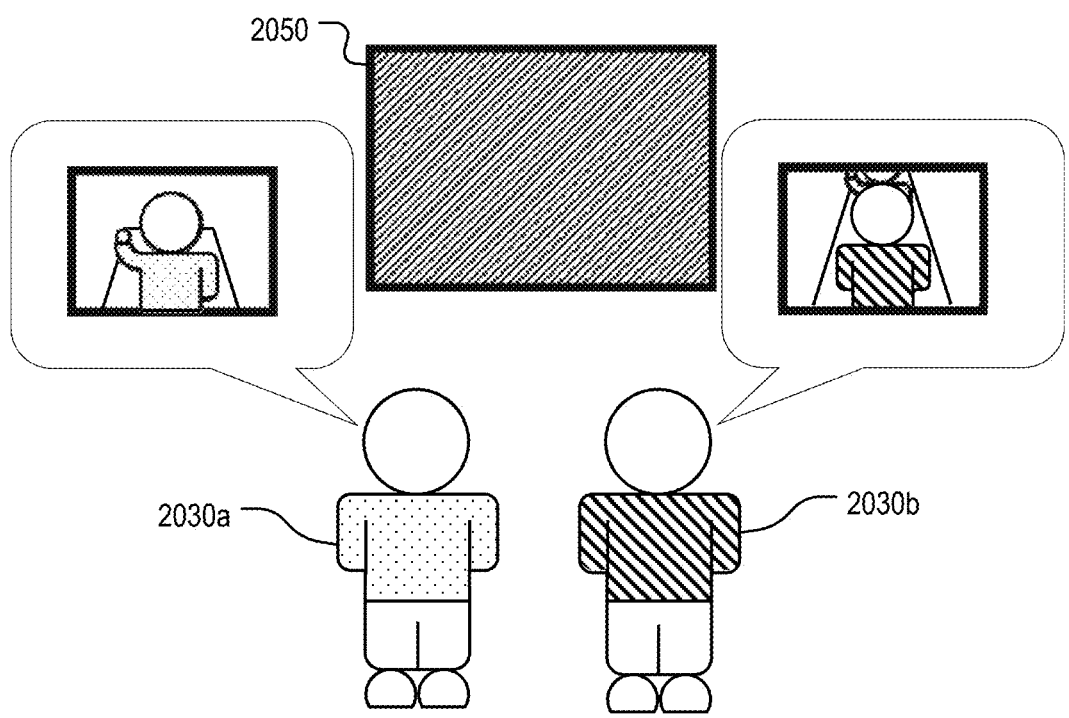

Once the photo, video, or other media has been taken, with or without the aid of an MV display, an image capture system might offer potential customers the opportunity to preview the media and make a purchase decision. FIGS. 20A-20B illustrate an example 2000 in which an MV display 2050 is used to facilitate previews and sales of photos. In FIG. 20A, the passengers 2030 on a ride 2070 may be photographed by a camera 2080 during the ride. The media (e.g., images captured by camera 2080) might be shown on the MV display 2050 in its original form or with effects added, or incorporated into a variety of products and formats, e.g., mugs, shirts, stickers, frames, holders, paperweights, and so forth. Since many other people might also be using the image capture system, there is typically a challenge of how many preview displays need to be provided, how large the media can be shown, how long the media can be available for viewing, and how each group finds their personal media. MV display systems address some to all of these issues by simultaneously showing multiple versions of content so different people in different locations see only their own version of content.

For instance, a single MV display 2050 can concurrently show images of the photos taken for a number of different customers 2030a-2030c, with each customer's media taking up the entire display. One family looking at the MV display 2050 will only see their media, while another family looking at the same time at the same MV display 2050 will only see their media. One MV display 2050 can serve the function of many ordinary displays. To achieve this, each MV display 2050 has multiple viewing zones, with each zone assigned a version of content. The zones might be arranged to correspond with the sequence in which customers waited in line to have their picture taken, the time the picture was taken, or some other criteria. In some embodiments, the family is given a number, letter, or pictorial icon that corresponds to signage near the MV display. By standing on or beneath or alongside the number, letter, image, or other designation, customers would be in a viewing zone that can only see their specific media. As another example, a customer's version of content might automatically be shown to the viewing zone of someone holding a corresponding RFID chip, quick read code, or magnetic strip; be based on facial recognition or fingerprints or other bio-metric reading; or some other technique.

Take the case of parents/guardians lining up to have their child's photo taken with Santa Claus, and then trying to decide if they want to purchase a copy of the photo. The MV display can concurrently show each set of parents the media taken of their child, without them being able to see media of other children. In this manner, the photos can be shown in a larger format, without the distraction of non-relevant images, and without having to wander among numerous displays.

To achieve this, the media of each child is designated as a unique version of content and linked to a viewing zone. The appropriate viewing zones might then be assigned to each set of parents automatically, with face recognition or some other form of tracking technology, by an assistant that oversees the process and makes the assignment manually on a personal device, or another method. In these cases, the parents might look at the MV display from wherever they are standing and automatically see pictures of their child as if the MV display was intended only for them and no one else. Alternatively, parents might shift position relative to the MV display until they find their content, or they might stand near a labeled viewing zone designated, e.g., by a number or icon. An elf may hand them a slip of paper with an image of a candy cane or stocking on it, and by standing near a sign with the matching image, parents can look at the MV display and see their child's picture with Santa, as an example.

A similar case might be an image capture system at a theme park attraction, as shown in FIGS. 20A-20B. 2030 could be photographed on the ride 2070, and the image offered for sale as they exit. The images for sale might be shown on an MV display 2050 that simultaneously shows many photos of guests, with each individual photo displayed at a large scale, and visible only from a specific viewing zone corresponding to the photographed guest.

Guests 2030 might see the different images each appear as the guests move relative to the MV display 2050. Alternatively, the guests 2030 might stand in a certain location relative to the MV display that is marked by a personal identifier, such as the guest's seat number or position on the attraction. Alternatively, the guest's image might be displayed on the MV display 2050 when the guest 2030 stands next to a reader that scans their RFID token, band, ticket, or card; their quick read code; their face, or fingerprint, other bio-metric reading; or some other identification technique. Since the MV display 2050 can simultaneously show many images at a scale that allows each image to entirely fill the MV display 2050, the ride operator can use fewer displays for displaying to the same number of guests, it can be less difficult and confusing for the guest to find the desired image, each image can be displayed larger, the images can be shown for a longer period of time, and other benefits.

For all the embodiments presented here, the term "display" may describe a single display, multiple displays, an array of displays, arrangements of displays, or even a single projection source (element or pixel), without limitation. In this disclosure, the term "display" is used interchangeably with such terms and concepts as signs, signage, signals, monitors, pixel arrays, strings of pixels, and may also refer to the use of multiple displays in various configurations. The embodiments presented here are meant as examples, and do not exclude alternative embodiments or combinations that fall within the spirit and scope of the present inventions.

Embodiments of the present invention may provide numerous advantages over existing systems for displaying cues or prompts to speakers presenting to an audience. For example, these embodiments may address limitations of teleprompters and other systems by enabling the targeting of individuals and groups to selectively see cues, prompts, messaging, notes, scripts, signals, graphics, imagery, media, and other forms of content, and to conceal this content from persons who are not the intended recipient. Embodiments may also provide the ability to simultaneously display multiple versions of content that each correspond to the specific needs of individuals or groups, while concealing content to yet other individuals or groups, if needed.

While the invention has been described in terms of particular embodiments and illustrative figures, those of ordinary skill in the art will recognize that the invention is not limited to the embodiments or figures described. For example, in various embodiments described above, the MV display is provided in a theater for a theatrical performance. In other embodiments, the MV display can be provided in any desired location, either indoors or outdoors, and for any type of presentation or event.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings, and/or examples making apparent to those skilled in the art how the several forms of the invention may be embodied in practice.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of displaying targeted instructions, the method comprising:
    operating an electronic multi-view display having a viewing surface configured to simultaneously display different content based on a viewer's position relative to the viewing surface, wherein the viewing surface is visible to viewers positioned in a viewing space and comprises a plurality of projection elements, the operating comprising:
        simultaneously projecting from each projection element a plurality of different color or intensity light, each different color or intensity light being projected in a respective one of a plurality of different directions such that at a given instant, a first projection element of the plurality of projection elements simultaneously projects a first color or intensity light in a first direction and a second color or intensity light in a second direction, wherein the first color or intensity light is different than the second color or intensity light and the first direction is different than the second direction; and
    displaying on the viewing surface first instructional content selectively targeted and visible to a first viewer positioned in a first viewing zone of the viewing space;
    wherein the first instructional content visible to the first viewer is displayed such that the first instructional content visible to the first viewer is not visible to a second viewer observing the viewing surface from a second viewing zone of the viewing space.

2. The method of claim 1, wherein:
the displaying first instructional content on the viewing surface comprises displaying text to be spoken by the first viewer.

3. The method of claim 1, wherein:
the displaying first instructional content on the viewing surface comprises displaying instructions for action to be performed by the first viewer.

4. The method of claim 1, wherein:
the displaying first instructional content on the viewing surface comprises displaying an image to be viewed by the first viewer.

5. The method of claim 1, wherein:
the displaying first instructional content on the viewing surface selectively targeted and visible to the first viewer comprises one or more of: displaying a preview of an image captured by an image capture device; displaying a graphical depiction of an action to be taken by the first viewer; displaying a graphical positioning cue of a movement or location for the first viewer; displaying one or more lights to cue the first viewer for an activity; or displaying content at a predefined rate or pattern.

6. The method of claim 1, further comprising:
displaying on the viewing surface second instructional content visible to the second viewer positioned in the second viewing zone simultaneously with displaying on the viewing surface first instructional content visible to the first viewer while positioned in the first viewing zone.

7. The method of claim 6, wherein the displaying on the viewing surface second instructional content visible to the second viewer comprises displaying interactive content to the second viewer, the interactive content relating to one or more of:
- a first performance by the first viewer;
- a second performance by the second viewer;
- a cue to the second viewer to take an action;
- a depiction of a performance action to be taken by the second viewer;
- a question;
- a challenge; or
- a puzzle.

8. The method of claim 1, wherein:
the displaying on the viewing surface first instructional content selectively targeted and visible to the first viewer positioned in the first viewing zone of the viewing space comprises displaying interactive content to a first audience member, the interactive content relating to one or more of: a question for the first audience member; a challenge for the first audience member; or a puzzle to be solved by the first audience member; and
the method further comprising detecting a response from the first viewer to the interactive content.

9. The method of claim 1, further comprising:
determining a first location of the first viewer;
detecting movement by the first viewer to a third viewing zone different than the first viewing zone; and
displaying on the viewing surface third instructional content visible to the first viewer while positioned in the third viewing zone;
wherein the third instructional content is displayed to the first viewer while positioned in the third viewing zone such that the third instructional content is not visible to viewers observing the viewing surface from the second viewing zone.

10. The method of claim 9, further comprising:
determining a second location of the second viewer in a fourth viewing zone;
detecting movement by the second viewer to a fifth viewing zone different than the fourth viewing zone; and
displaying on the viewing surface fourth instructional content visible to the second viewer while positioned in the fourth viewing zone simultaneously with displaying on the viewing surface third instructional content visible to the first viewer while positioned in the third viewing zone.

11. The method of claim 9, wherein:
the determining the first location of the first viewer comprises identifying the first viewer in a first image of the first viewing zone captured by a camera; and
the detecting movement by the first viewer to the third viewing zone comprises identifying the first viewer in a second image of the third viewing zone captured by the camera.

12. The method of claim 1, further comprising:
capturing an image of the second viewer in the second viewing zone; and
displaying on the viewing surface a preview of the image captured of the second viewer, the preview being visible to viewers in the first viewing zone but not viewers in the second viewing zone.

13. The method of claim 1, further comprising:
displaying on the viewing surface information about the second viewer in the second viewing zone, the information about the second viewer being visible to viewers in the first viewing zone but not viewers in the second viewing zone.

14. The method of claim 13, further comprising:
receiving information about the second viewer, the information comprising one or more of the second viewer's name, age, grade, or a request.

15. The method of claim 1, further comprising:
displaying on the viewing surface interaction information, the interaction information being visible to the first viewer in the first viewing zone but not the second viewer in the second viewing zone; and
displaying on the viewing surface content visible to the second viewer in the second viewing zone;
wherein the interaction information relates to one or more of: a transaction between the first viewer and the second viewer; information to be gathered by the first viewer about the second viewer; confidential or sensitive information about the second viewer; a sales transaction between the first viewer and the second viewer; a check-in process between a staff member and a guest; medical information about the second viewer to be viewed by a medical professional first viewer.

16. The method of claim 1, further comprising:
capturing a first image of the first viewer engaging in an activity;
capturing a second image of the second viewer engaging in the activity;
displaying on the viewing surface the first image visible to viewers in the first viewing zone but not viewers in the second viewing zone; and
displaying on the viewing surface the second image visible to viewers in the second viewing zone but not viewers in the first viewing zone.

17. The method of claim 1, wherein:
the first viewing zone and the second viewing zone are associated with respective locations on a performance area; and
the first instructional content is displayed on the viewing surface such that the first instructional content is not visible to the second viewer observing the viewing surface from the second viewing zone and a third viewing zone associated with a first location in a spectator area.

18. The method of claim 1, further comprising:
receiving information from one or more viewers in the second viewing zone; and
displaying on the viewing surface the information such that the information is not visible to viewers observing the viewing surface from the second viewing zone.

19. The method of claim 1, further comprising:
receiving information from a sensor in the second viewing zone or from a second computing device over a network; and
displaying on the viewing surface the first instructional content relating to the information from the sensor or from the second computing device such that the first instructional content is not visible to viewers observing the viewing surface from the second viewing zone.

20. The method of claim 1, wherein:
the displaying on the viewing surface first instructional content selectively targeted and visible to the first viewer positioned in the first viewing zone of the viewing space comprises displaying a graphical positioning cue of a movement or location for the first viewer.

21. A computing system for displaying targeted instructions, comprising:
 a processor; and
 a non-transitory computer-readable memory storing computer-executable instructions which when executed cause the processor to perform a method comprising:
  operating an electronic multi-view display having a viewing surface configured to simultaneously display different content based on a viewer's position relative to the viewing surface, wherein the viewing surface is visible to viewers positioned in a viewing space and comprises a plurality of projection elements, the operating comprising:
  simultaneously projecting from each projection element a plurality of different color or intensity light, each different color or intensity light being projected in a respective one of a plurality of different directions such that at a given instant, a first projection element of the plurality of projection elements simultaneously projects a first color or intensity light in a first direction and a second color or intensity light in a second direction, wherein the first color or intensity light is different than the second color or intensity light and the first direction is different than the second direction; and
  displaying on the viewing surface first instructional content visible to a first viewer positioned in a first viewing zone of the viewing space, the first instructional content comprising one or more of: text to be spoken by the first viewer, instructions for action by the first viewer, or an image to be viewed by the first viewer;
  wherein the first instructional content is displayed such that the first instructional content is not visible to viewers observing the viewing surface from a second viewing zone of the viewing space.

22. The computing system of claim 21, wherein the computer-executable instructions when executed cause the processor to:
 display first instructional content on the viewing surface by displaying text to be spoken by the first viewer.

23. The computing system of claim 21, wherein the computer-executable instructions when executed cause the processor to:
 display first instructional content on the viewing surface by displaying instructions for action to be performed by the first viewer.

24. The computing system of claim 21, wherein the computer-executable instructions when executed cause the processor to:
 display first instructional content on the viewing surface by displaying a preview image to be viewed by the first viewer.

25. The computing system of claim 21, wherein the computer-executable instructions when executed cause the processor to perform the method further comprising:
 determining a first location of the first viewer;
 detecting movement by the first viewer to a third viewing zone different than the first viewing zone; and
 displaying on the viewing surface third instructional content visible to the first viewer while positioned in the third viewing zone;
 wherein the third instructional content is displayed to the first viewer while positioned in the third viewing zone such that the third instructional content is not visible to viewers observing the viewing surface from the second viewing zone.

26. The computing system of claim 25, wherein the computer-executable instructions when executed cause the processor to:
 determine the first location of the first viewer by identifying the first viewer in a first image of the first viewing zone captured by a camera; and
 detect movement by the first viewer to the third viewing zone by identifying the first viewer in a second image of the third viewing zone captured by the camera.

27. The computing system of claim 21, wherein the computer-executable instructions when executed cause the processor to perform the method further comprising:
 capturing an image of a second viewer in the second viewing zone; and
 displaying on the viewing surface a preview of the image captured of the second viewer, the preview being visible to viewers in the first viewing zone but not viewers in the second viewing zone.

* * * * *